(12) United States Patent
Park et al.

(10) Patent No.: US 7,802,651 B2
(45) Date of Patent: Sep. 28, 2010

(54) AIR DUCT ASSEMBLY FOR VEHICLES

(75) Inventors: Min-Yong Park, Pyeongtaek-si (KR); Hyung-Ki Moon, Seoul (KR); In-Su Shin, Suwon-si (KR)

(73) Assignee: Daeki Corporation (KR)

( * ) Notice: Subject to any disclaimer, the term of this patent is extended or adjusted under 35 U.S.C. 154(b) by 0 days.

(21) Appl. No.: 12/332,867

(22) Filed: Dec. 11, 2008

(65) Prior Publication Data

US 2009/0178879 A1    Jul. 16, 2009

(30) Foreign Application Priority Data

| Dec. 12, 2007 | (KR) | ................ 10-2007-0129347 |
| Jun. 20, 2008 | (KR) | ................ 10-2008-0058337 |
| Dec. 2, 2008 | (KR) | ................ 10-2008-0121458 |

(51) Int. Cl.
  *E04F 17/04* (2006.01)
  *F02M 35/00* (2006.01)
  *B01D 39/00* (2006.01)
  *B01D 50/00* (2006.01)

(52) U.S. Cl. ............... 181/224; 181/229; 55/385.3; 55/502

(58) Field of Classification Search ............ 181/224, 181/229; 55/385.3, 502
See application file for complete search history.

(56) References Cited

U.S. PATENT DOCUMENTS

| 2,999,562 | A | * | 9/1961 | Lechtenberg | ............ 55/502 |
| 3,656,462 | A | * | 4/1972 | Bailey | .............. 123/556 |
| 3,796,027 | A | * | 3/1974 | Gumtow | ............ 55/502 |
| 4,548,166 | A | * | 10/1985 | Gest | ............... 123/198 E |
| 5,474,599 | A | * | 12/1995 | Cheney et al. | .............. 96/55 |
| 5,494,497 | A | * | 2/1996 | Lee | ............... 55/480 |
| 6,199,657 | B1 | * | 3/2001 | Misawa et al. | .............. 181/229 |
| 6,920,959 | B2 | * | 7/2005 | Han et al. | .............. 181/224 |
| 6,959,678 | B2 | * | 11/2005 | Kino et al. | .............. 123/184.53 |
| 7,025,799 | B2 | * | 4/2006 | Peterson | ............... 55/385.3 |

(Continued)

FOREIGN PATENT DOCUMENTS

JP    06-156051 A    6/1994

(Continued)

OTHER PUBLICATIONS

"Korean Application Serial No. 10-2007-0129347, Office Action dated Jan. 29, 2009", 4 pgs.

(Continued)

*Primary Examiner*—Jeffrey Donels
*Assistant Examiner*—Christina Russell
(74) *Attorney, Agent, or Firm*—Schwegman, Lundberg & Woessner, P.A.

(57) ABSTRACT

Disclosed herein is an air duct assembly for vehicles which reduces noise generated by the flow of intake air which flows along a path of the air duct provided in a vehicle and is fed to an engine. The air duct reduces the noise of a low frequency range in initial engine start operation, and in addition, the noise of a whole frequency range, thus allowing a vehicle to be traveled while providing the environment having minimum noise to a driver and passenger riding in the vehicle. Therefore, it is not necessary to install an additional resonator.

19 Claims, 25 Drawing Sheets

U.S. PATENT DOCUMENTS

| | | | |
|---|---|---|---|
| 7,083,514 B1 * | 8/2006 | Stamey et al. | 454/156 |
| 7,174,872 B2 * | 2/2007 | Kino et al. | 123/184.57 |
| 7,621,372 B2 * | 11/2009 | Yamaura et al. | 181/229 |
| 2001/0011448 A1 * | 8/2001 | Kino et al. | 55/385.3 |
| 2003/0182910 A1 * | 10/2003 | Pikesh et al. | 55/396 |
| 2004/0011011 A1 * | 1/2004 | Storz et al. | 55/385.3 |
| 2005/0060972 A1 * | 3/2005 | Gieseke et al. | 55/385.3 |
| 2008/0028938 A1 * | 2/2008 | Li | 96/134 |

FOREIGN PATENT DOCUMENTS

| | | |
|---|---|---|
| JP | 2002-172923 A | 6/2002 |
| KR | 10-2006-0030582 A | 4/2006 |

OTHER PUBLICATIONS

"Korean Application Serial No. 10-2008-0058337, Office Action dated Sep. 29, 2008", 3 pgs.

* cited by examiner

← FRONT OF VEHICLE    BACK OF VEHICLE →

AIR DUCT ASSEMBLY FOR VEHICLES

RELATED APPLICATIONS

This application claims priority under 35 U.S.C. 119 to Korean Patent Application No. 10-2007-0129347, filed Dec. 12, 2007; Korean Patent Application No. 10-2008-0058337, filed Jun. 20, 2008; and Korean Patent Application No. 10-2008-0121458, filed Dec. 2, 2008, which applications are incorporated herein by reference and made a part hereof.

BACKGROUND OF THE INVENTION

1. Field of the Invention

The present invention relates to an air duct assembly for vehicles, in which a filter for reducing noise over the whole frequency range is mounted to an air duct installed in a vehicle, thus effectively reducing noise which is generated as external air is drawn into the vehicle from an initial starting operation to a high-speed running operation, therefore providing a quiet environment.

2. Description of the Related Art

Generally, an intake system for vehicles includes an air cleaner, an air intake hose, a throttle body and an intake manifold. The air cleaner purities air which is drawn through an air duct. The air intake hose is used to couple the air cleaner with the surge tank of the intake manifold. The throttle body is mounted to the surge tank. The intake manifold is provided with outlets which distribute the drawn air to respective cylinders.

The external air fed through the intake system to cylinders in an engine is drawn by the intake pressure of the engine. When the external air is drawn and circulated, intake noise generated by the circulation of the air is transmitted to the interior of a vehicle, thus hindering comfortable driving.

Thus, typically, in order to prevent noise from being generated in the intake system, a resonator is installed on the air duct which is coupled to the air cleaner and reduces noise generated when air circulates through the air duct.

The resonator is the device which reduces noise of a specific frequency transferred along intake and exhaust passages using the principle of resonance. In order to reduce noise in a specific frequency range, various types of resonators have been currently developed.

The resonator is used to tune and reduce noise of a specific frequency range. However, the conventional resonator is problematic in that it is difficult to install the resonator according to the layout of an engine room. Further, the resonator does not reliably reduce noise of a desired frequency range, thus causing noise due to unintended frequency characteristics, therefore hindering a driver or passenger riding in a vehicle from feeling comfortable, deteriorating the reliability of the vehicle and causing dissatisfaction.

Therefore, the inventor of the present invention has proposed an air duct assembly for vehicles, which is capable of more reliably reducing noise generated in an air duct.

SUMMARY OF THE INVENTION

Accordingly, the present invention has been made keeping in mind the above problems occurring in the prior art, and an object of the present invention is to provide an air duct assembly for vehicles, which reduces noise in the whole frequency range generated in an air duct, thus minimizing the transfer of noise to a driver and passenger riding in a vehicle, therefore allowing the vehicle to be traveled under stable and quiet environment.

In order to accomplish the above object, the present invention provides an air duct assembly for vehicles, including an air duct having at a first end thereof an inlet port such that fresh air outside an engine room is introduced into the air duct, and having at a second end thereof an outlet port coupled to an air cleaner, with an air hole formed in a path along which intake air flows, and a filter unit mounted to the air hole of the air duct and made of a polyurethane foam material to reduce noise of the intake air circulating through the air duct in a whole frequency range.

The filter unit comprises polyurethane foam having pores from 50 to 100 ppi.

The filter unit comprises polyurethane foam having pores of 80 ppi.

The air duct comprises a first air duct and a second air duct which are joined together, the second air duct having an air hole, and a noise reduction unit is provided on the first air duct in such a way as to face the air hole formed in the second air duct and protrude out from the first air duct in a rounded shape, and delays a flow of the intake air circulating through the air duct according to variation of rpm of an engine, thus reducing noise.

The first air duct extends to the outlet port such that a width of a portion around the inlet port is relatively larger than a height thereof, and a width of a portion around the outlet port becomes short and a height thereof becomes long, with a first support rib protruding from an upper surface of the first air duct in a transverse direction thereof to reinforce strength of the first air duct, and the second air duct is coupled to a lower portion of the first air duct, with a second support rib protruding from the second air duct in a longitudinal direction thereof.

The air duct includes a support cover mounted to a lower portion of the filter unit so as to prevent removal of the filter unit and stably support the filter unit, and a discharge hole is formed in the support cover to reliably discharge the intake air which passes through the filter unit and circulates. The support cover includes a seating groove formed along an inner edge of the support cover at a position outside the discharge hole so that the filter unit is seated into the seating groove, and a locking hook provided at a position outside the seating groove and locked to the air duct.

One or more layers of guide plates are provided on an outer surface of the support cover in such a way as to be widened in a direction from an upper end of each of the guide plates to a lower end thereof, thus preventing foreign materials from entering the air duct and downwardly guiding a flow of fluid discharged from the air duct to an exterior, therefore reducing noise generated by the flow of the fluid.

The filter unit made of the polyurethane foam material is directly mounted to the air hole of the air duct through ultrasonic fusion or thermal fusion, thus reducing the number of working processes.

A screen having a plurality of holes is secured to the air duct to prevent removal of the filter unit and stably support the filter unit, the screen being coupled to the air duct through stacking fusion.

The filter unit has a chamber therein to reduce velocity of the intake air which passes through the filter unit. The filter unit includes a first filter bent at an edge thereof downwards to have a first bent part, a second filter coupled to a lower portion of the first filter and bent at an edge thereof upwards to have a second bent part, and a chamber is defined in a central portion between the first and second filters which are in surface contact with each other, and reduces velocity of the intake air which passes through the first filter.

Assuming that a total thickness of the first and second bent parts of the first and second filters is t1, a thickness of the central portion between the first and second filters is ½*t1 to minimize resistance of the intake air and permit smooth flow thereof.

A guide vane is mounted to the lower portion of the filter unit and guides the intake air, passing through the filter unit and discharged to an outside of the air duct, to a front of a vehicle, thus minimizing transmission of noise to an interior of the vehicle. A sound absorbing material is attached to an inner surface of the guide vane which is in surface contact with exhaust air.

BRIEF DESCRIPTION OF THE DRAWINGS

The above and other objects, features and advantages of the present invention will be more clearly understood from the following detailed description taken in conjunction with the accompanying drawings, in which:

FIG. 7b is a sectional view of FIG. 7a;

FIG. 12b is a sectional view taken along line B-B' of FIG. 12a;

DESCRIPTION OF THE PREFERRED EMBODIMENTS

Figure 1:
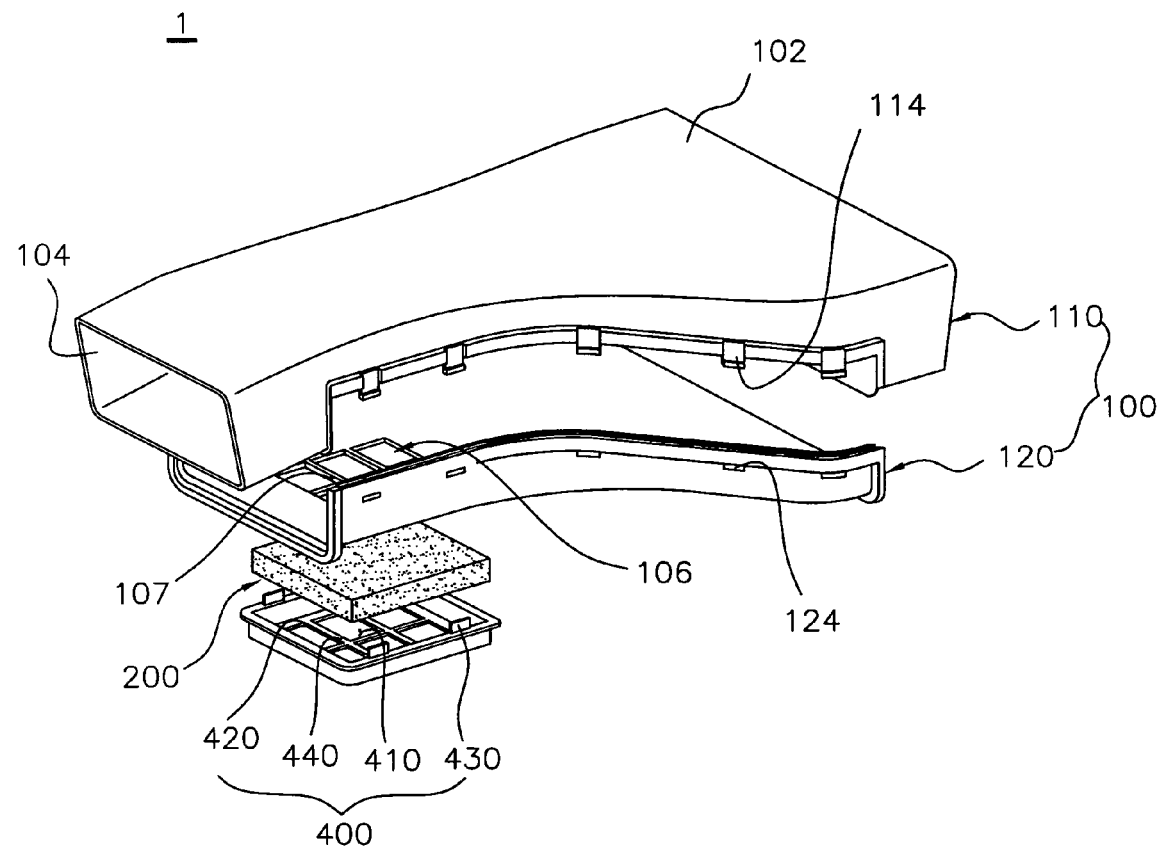
FIG. 1 is an exploded perspective view illustrating an air duct assembly for vehicles according to the present invention.

Hereinafter, an air duct assembly for vehicles according to the preferred embodiment of the present invention will be described with reference to the accompanying drawings.

Referring to FIGS. 1 to 19a and 19b, the air duct assembly 1 for vehicles according to the present invention includes an air duct 100 and a filter unit 200. The air duct 100 has on one end thereof an inlet port 102 such that fresh air outside an engine room is introduced into the air duct 100, and has on the other end an outlet port 104 which is coupled to an air cleaner 2. Further, an air hole 106 is formed in the air duct 100 on a path along which intake air flows. The filter unit 200 having a plurality of pores is attached to the air hole 106 of the air duct 100 and functions to reduce noise of the intake air which circulates through the air duct 100 in the whole frequency range.

The air hole 106 formed in the air duct 100 according to the present invention is placed adjacent to the air cleaner 2.

The reason is as follows. That is, noise is generated in the air duct 100 due to resonance while external air is introduced and drawn in the longitudinal direction of the air duct 100. Among positions in the longitudinal direction of the air duct 100, the maximum intake noise occurs at a position adjacent to the air cleaner 2. Thus, in order to reduce the intake noise, the air hole 106 is preferably formed at a position adjacent to the air cleaner 2.

According to the present invention, assuming that the entire length of the air duct 100 is L, the air hole 106 of the air duct 100 is formed at a ⅔L position distant from the inlet port 102.

The air duct 100 according to the present invention includes a first air duct 110 and a second air duct 120 which are joined together. The first air duct 110 extends to the outlet port 104, and the portion of the first air duct 110 in which the inlet port 102 is provided is formed such that a width is relatively longer than a height. The portion of the first air duct 110 in which the outlet port 104 is provided is formed such that a width is reduced but a height is increased. In order to increase the strength of the first air duct 110, first support ribs protrude from the upper surface of the first air duct 110 in the transverse direction thereof.

The second air duct 120 is coupled to the lower portion of the first air duct 110. Second support ribs protrude from the second air duct 120 in the longitudinal direction thereof. The air hole 106 is formed in the second air duct 120.

In the air duct 100 according to the present invention, a noise reduction unit 300 is provided on the first air duct 110 in such a way as to face the air hole 106 formed in the second air duct 120 and protrudes out from the first air duct 110 in a rounded shape. The noise reduction unit 300 delays the flow of the intake air which circulates through the air duct 100 according to the variance of rpm of an engine, thus reducing noise.

The noise reduction unit 300 according to the present invention is oriented in the transverse direction of the first air duct 110. The noise reduction unit 300 has a hemispherical or elliptical shape, and preferably has a height which does not interfere with peripheral components when the air duct 100 is installed in the engine room of a vehicle.

A noise reduction unit 300' according to another embodiment of the present invention is oriented in the longitudinal direction of the first air duct 110.

The air hole 106 of the second air duct 102 according to the present invention is bored along the curved shape of the second air duct 120.

The filter unit 200 according to the present invention is made of a polyurethane foam material having the pores from 50 to 100 ppi (Pore Per Inch).

Preferably, the filter unit 200 according to the present invention is made of a polyurethane foam material having the pores of 80 ppi.

According to the present invention, the width a and the length b of the filter unit 200 may be equal to each other, and one of the width a or length b may be longer than the remaining one. The width a and length b may be changed according to the shape of the second air duct 120.

In the air duct 100 according to the present invention, a support cover 400 is mounted to the lower portion of the filter unit 200 to prevent the removal of the filter unit 200 and stably support the filter unit 200.

A discharge hole 410 is formed in the support cover 400 to reliably discharge the intake air which passes through the filter unit 200.

The support cover 400 according to the present invention includes a seating groove 420 and locking hooks 430. The seating groove 420 is formed along the inner edge of the support cover 400 at a position outside the discharge hole 410, so that the filter unit 200 is received and seated into the support cover 400. The locking hooks 430 are formed outside the seating groove 420 and locked to the air duct 100.

A filter unit 200' according to another embodiment of the present invention includes a first filter 210', a second filter 220' and a chamber 230'. The first filter 210' has a first bent part 212' whose edge is bent downwards. The second filter 220' is coupled to the lower portion of the first filter 210' and has a second bent part 222' whose edge is bent upwards. The chamber 230' is formed in a central portion at which the first and second filters 210' and 220' are in surface contact with each other, and reduces the velocity V of the intake air which passes through the first filter 210'.

In the first and second filters 210' and 220' according to the present invention, assuming that the total thickness of the first and second bent parts 212' and 222' is t1, the thickness of the central portion in the first and second filters 210' and 220' is ½*t1 so as to minimize the resistance of the intake air and permit the smooth flow of the intake air.

An adhesive layer 240' is applied to a portion at which the first and second bent parts 212' and 222' of the first and second filters 210' and 220' are in surface contact with each other, so that the first and second filters 210' and 220' are integrated with each other.

A guide vane 500 is mounted to the lower portion of the filter unit 200 of the present invention, and guides the intake air, which passes through the filter unit 200 and is discharged to the outside of the air duct 100, to the front of the vehicle, thus minimizing the transmission of noise into the vehicle.

The guide vane 500 according to the present invention includes a sound absorbing material 510 which is attached to the inner surface of the guide vane 500 which is in surface contact with exhaust air. Preferably, the sound absorbing material 510 uses a foam material to reduce noise which is discharged through the guide vane 500.

The assembled state of the air duct assembly for vehicles according to the present invention constructed as described above will be described below with reference to the accompanying drawings.

Referring to FIG. 1, the air duct 1 for vehicles according to the present invention is constructed so that the second air duct 120 is coupled to the lower portion of the first air duct 110. Coupling ribs 114 are provided on both sides of the first air duct 110 to be positioned between the inlet port 102 and the outlet port 104, and are inserted into insert holes 124 formed in the second air duct 120, so that the first and second air ducts 110 and 120 are assembled with each other.

In order to install the filter unit 200 to the air hole 106 formed in the second air duct 120, a worker seats filter unit 200 in the seating groove 420 of the support cover 400. While the worker holds the support cover 400 receiving the filter unit 200 with his or her hand, the support cover 400 is coupled to the lower portion of the air hole 106 in the second air duct 120.

In the support cover 400 according to the present invention, the locking hooks 430 are provided outside the seating groove 420 to be spaced apart therefrom, so that the support cover 400 is coupled to the second air duct 120 via the locking hooks 430.

According to the present invention, the first support ribs are formed on the first air duct 110 in such a way as to be arranged in the transverse direction thereof, and the second support ribs are formed on the second air duct 120 in such a way as to extend from the air hole 106 to the outlet port 104. Thus, when the intake air flows through the inlet port 102 to the outlet port 104, with the first and second air ducts 110 and 120 coupled to each other, the first and second support ribs minimize deformation, in addition to increasing the structural strength.

First separation pieces 107 are formed in the air hole 106 according to the present invention to separate the whole air hole 106 in a lattice form. The first separation pieces 107 serve to support and reinforce a portion having the air hole 106.

Further, second separation pieces 440 having the same construction as the first separation pieces 107 formed in the air hole 106 are provided in the discharge hole 410 of the support cover 400, thus supporting and reinforcing the support cover 400.

Figure 2:
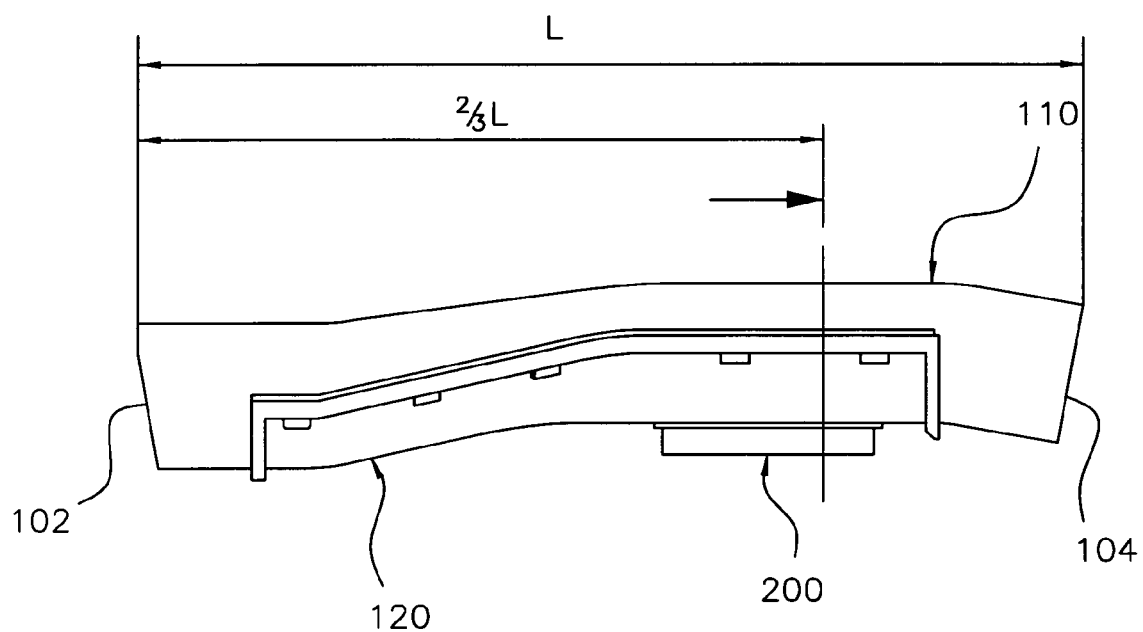
FIG. 2 is a side view illustrating the air duct assembly for vehicles according to the present invention.
Figure 3:
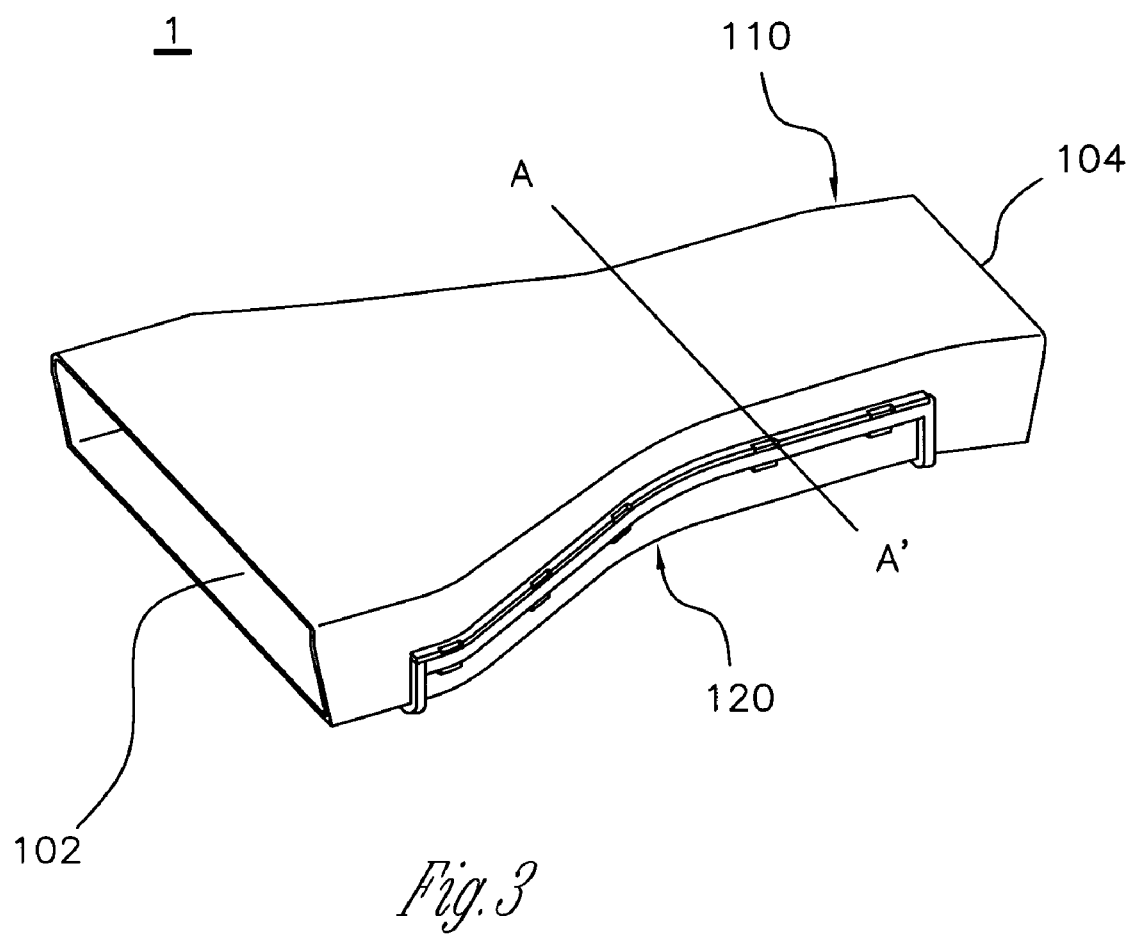
FIG. 3 is a perspective view illustrating the assembled state of the air duct assembly for vehicles according to the present invention.

When the air duct assembly 1 of the present invention has been assembled, the air duct assembly 1 has the state of FIGS. 2 and 3.

In the air duct assembly 1 according to the present invention, the width of the inlet port 102 is relatively longer than the height. The width of the outlet port 106 is relatively shorter than that of the inlet port 102, while the height of the outlet port 104 is relatively longer than that of the inlet port 102.

Figure 4:
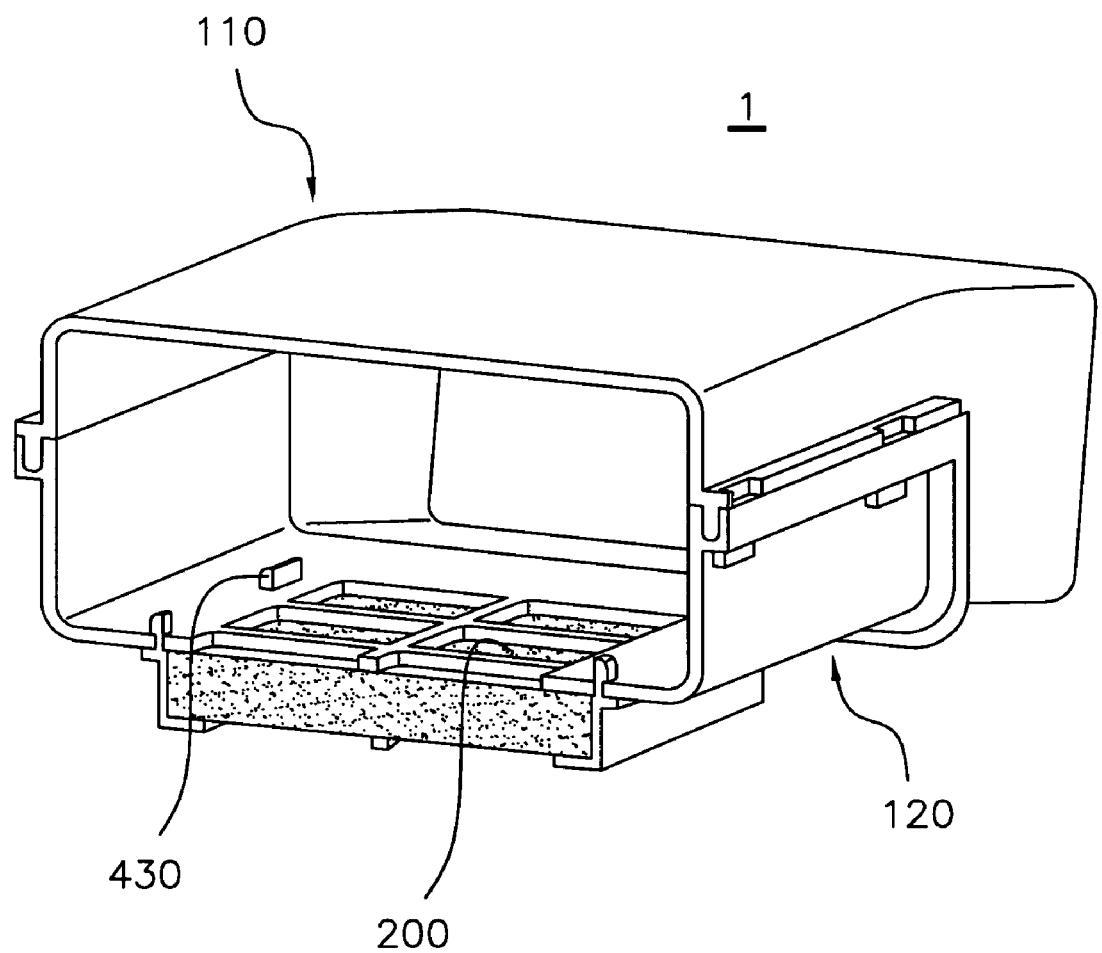
FIG. 4 is a cutaway perspective view taken along line A-A' of FIG. 3.

Referring to FIG. 4, when seeing the air duct assembly of the present invention along line A-A' of FIG. 3, the filter unit 200 of the present invention is secured to the lower portion of the second air duct 120 to be in close contact therewith. Further, the locking hooks 430 allow the filter unit 200 to be held on the second air duct 120 without being removed therefrom.

Figure 5A:
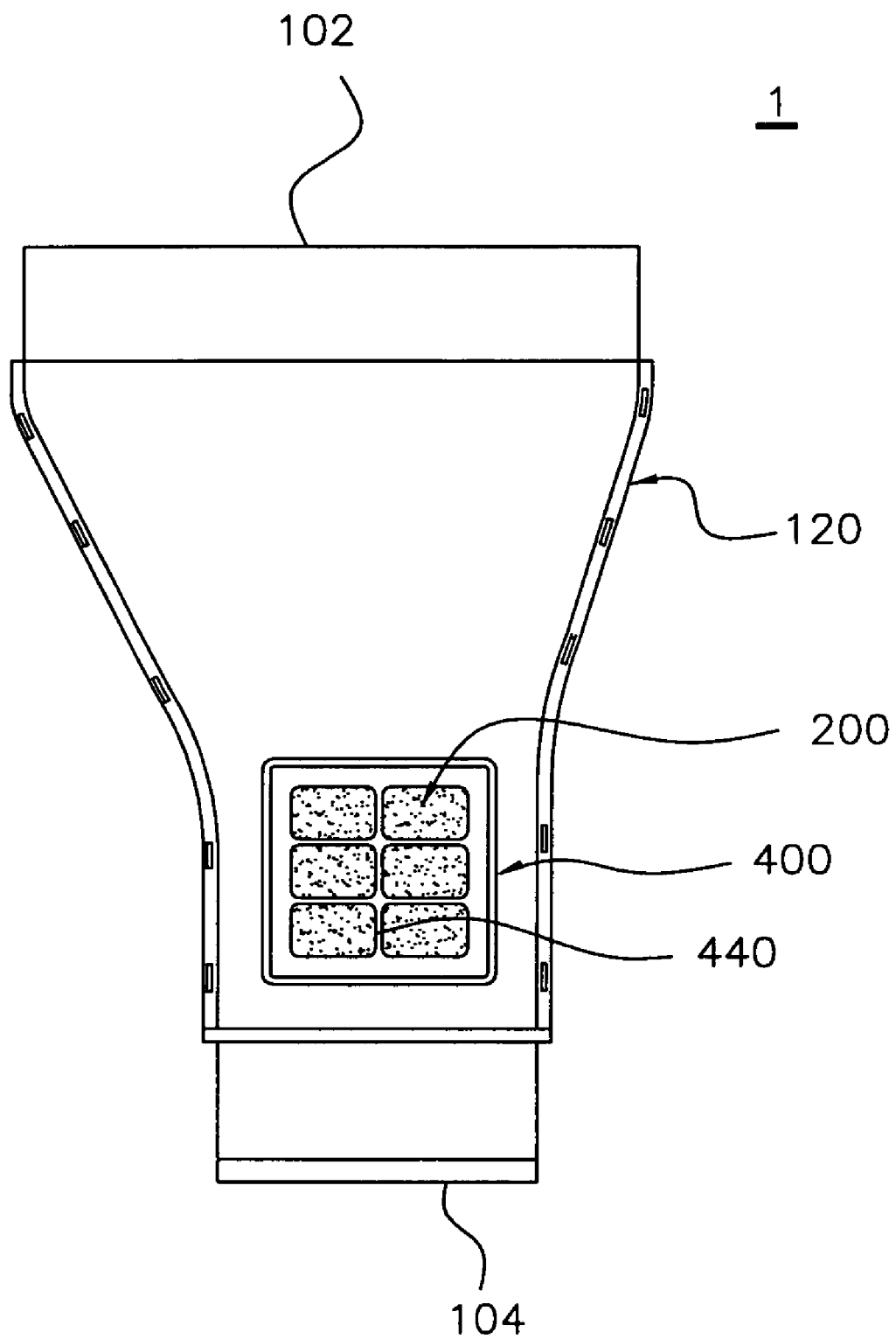
FIGS. 5a and 5b are bottom views illustrating the air duct assembly for vehicles according to the present invention.
Figure 5B:
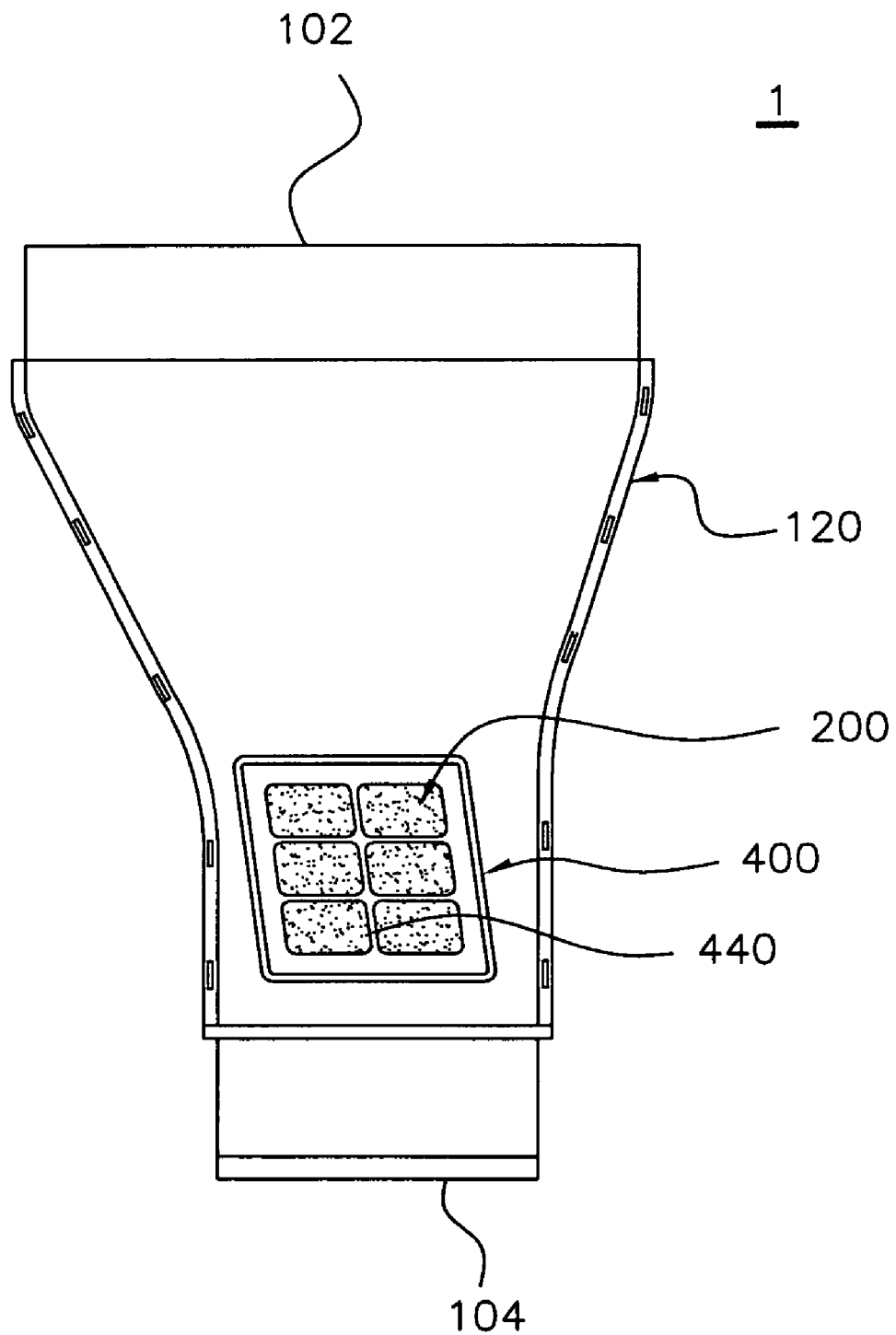
Figure 6A:
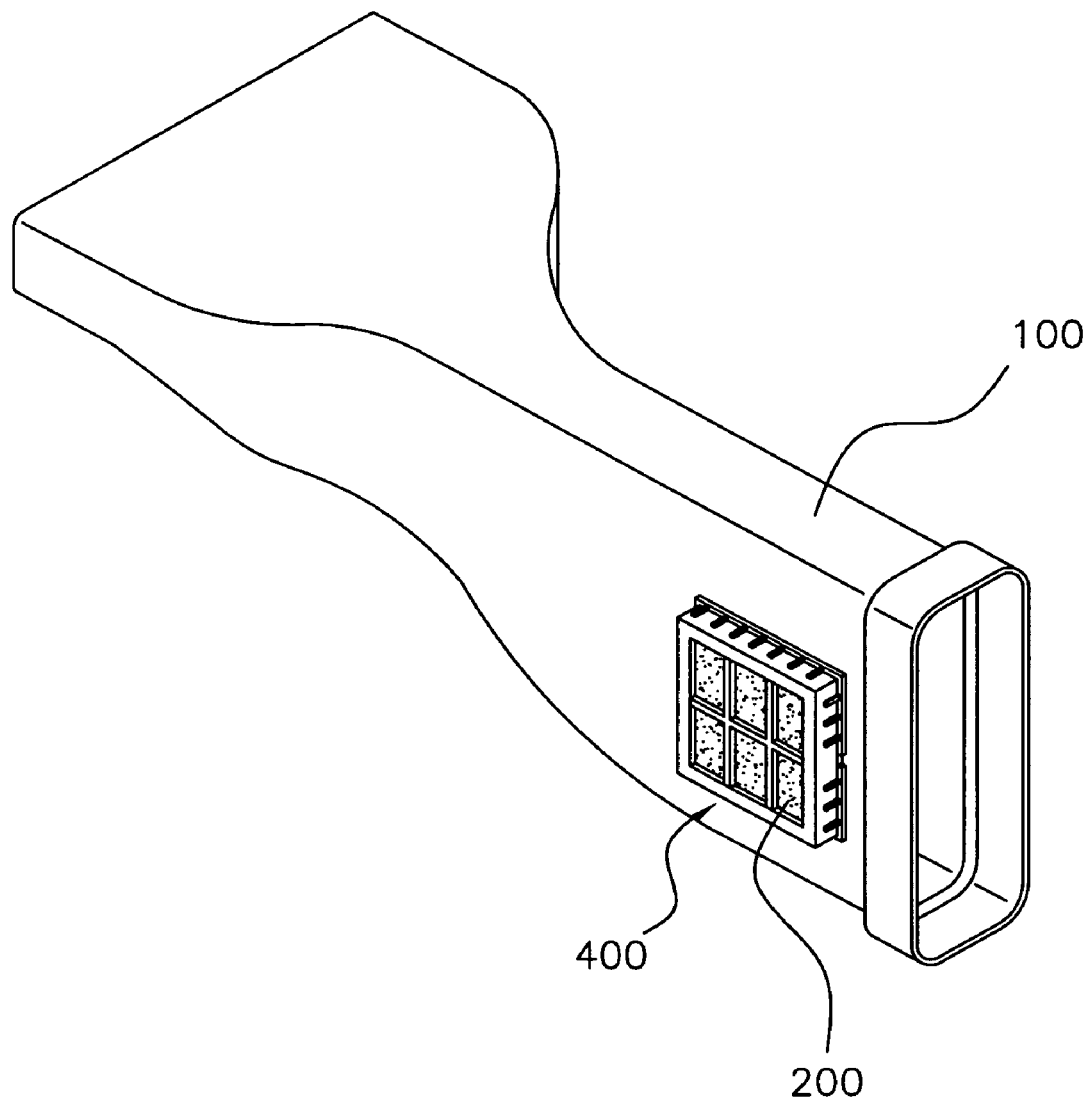
FIGS. 6a and 6b are views illustrating an embodiment of a filter unit coupled to the air duct assembly for vehicles according to the present invention.
Figure 6B:
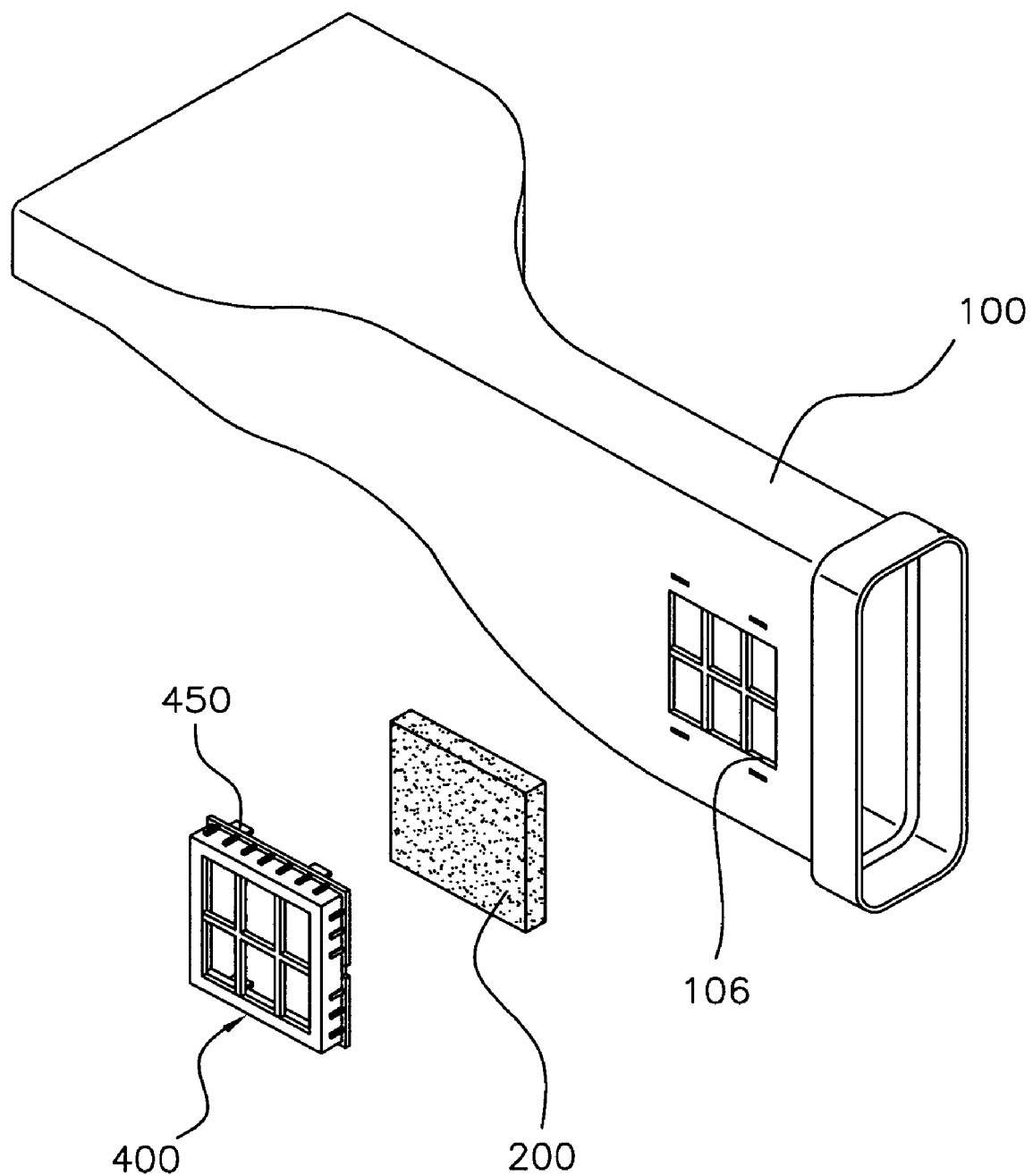

Referring to FIGS. 5a and 5b, the air hole 106 (see FIG. 1) according to the present invention is formed as shown in FIGS. 5a and 5b according to the shape of the second air duct 120. In such a state, the filter unit 200 and the support cover 400 are secured to the air hole 106.

Figure 7A:
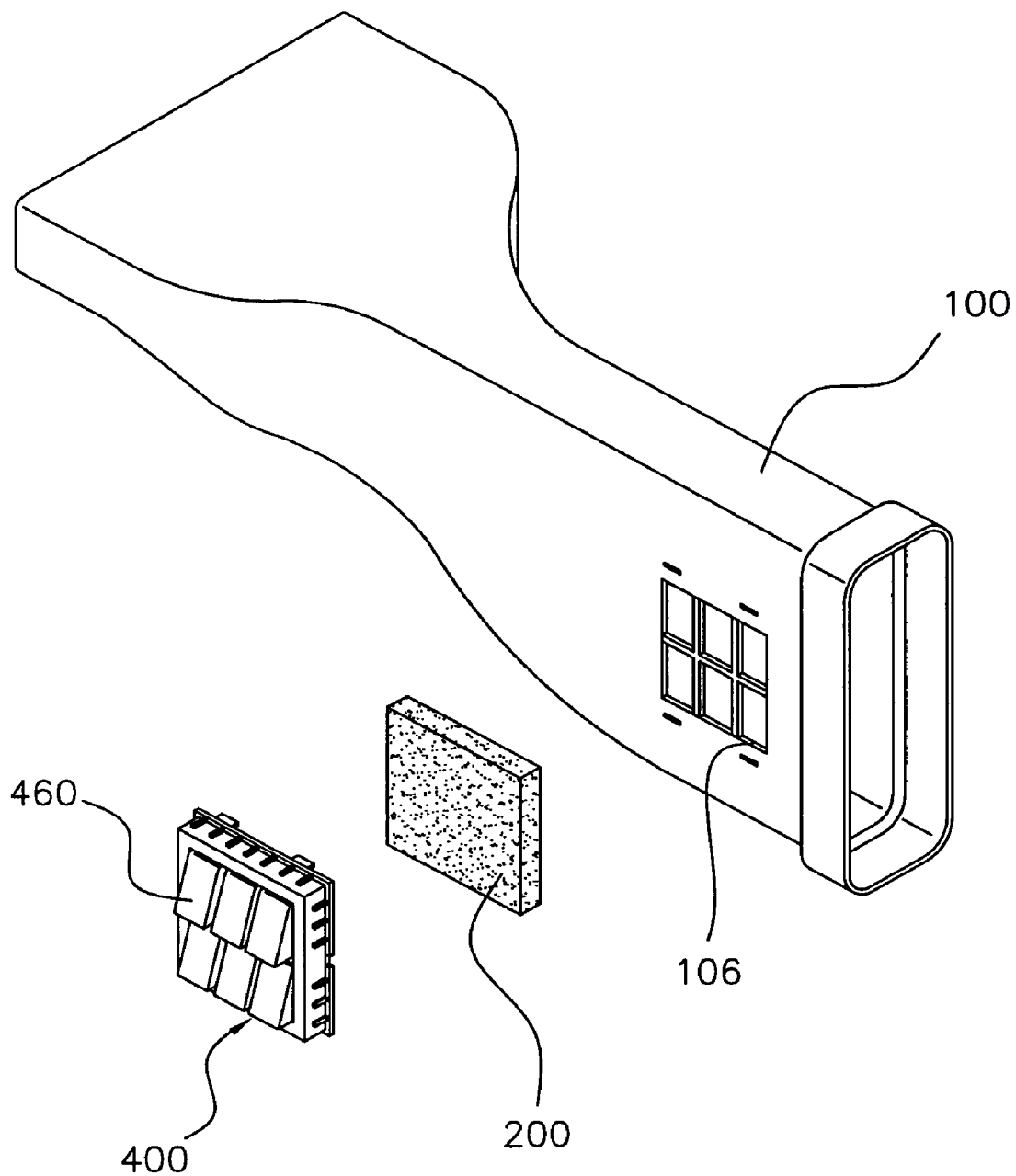
FIG. 7a is a view illustrating a support cover having guide plates, which is to be coupled to the air duct assembly for vehicles according to the present invention.
Figure 7B:
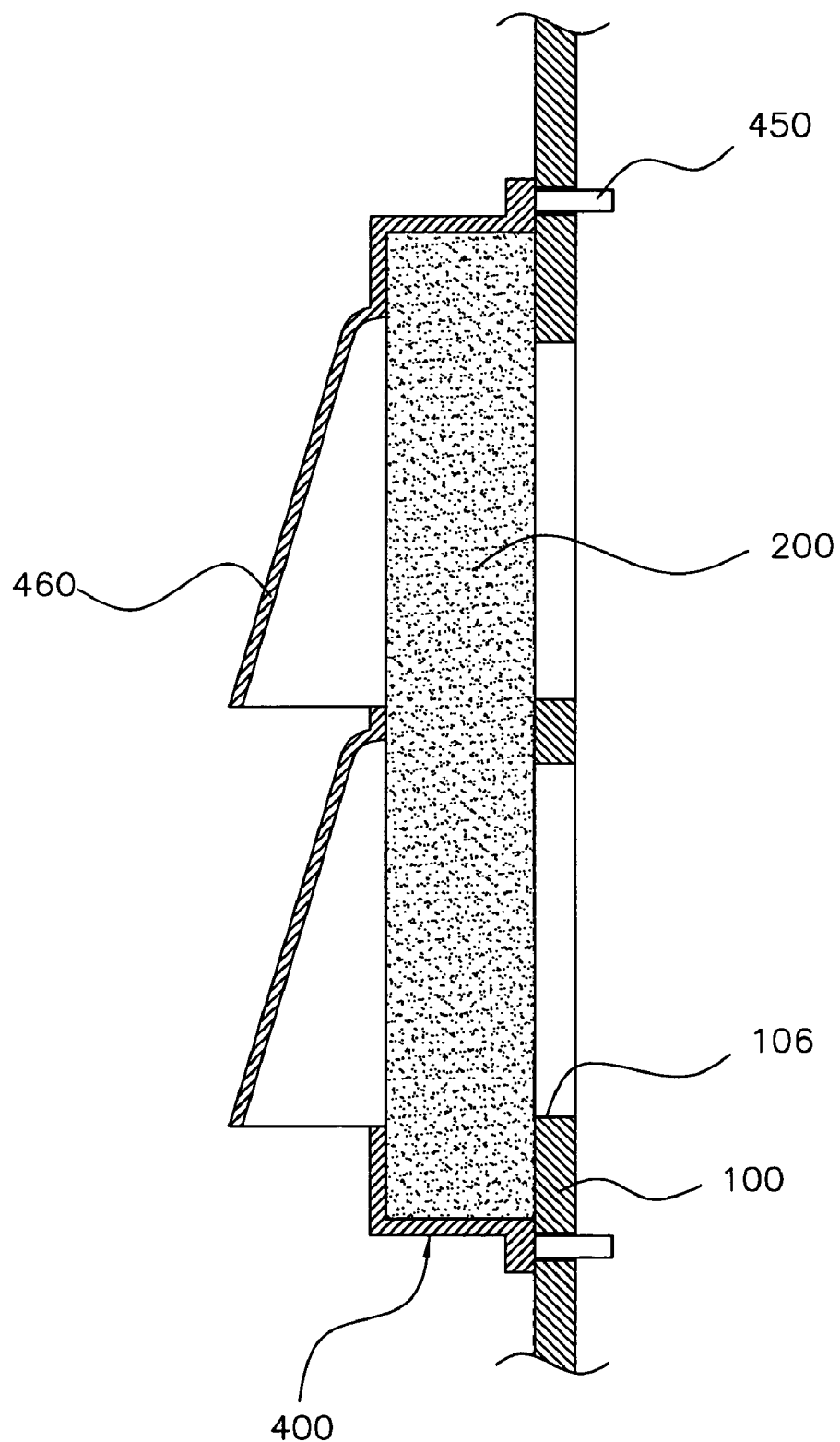

FIGS. 6a, 6b, 7a and 7b illustrate another embodiment of a support cover 400 according to the present invention. Referring to the drawings, the support cover 400 of the present invention is coupled to the air duct 100 using fitting protrusions 450 formed on the support cover 400 through force-fitting. As such, according to this embodiment, the support cover 400 and the air duct 100 are coupled to each other simply through force-fitting, thus improving productivity. Further, as shown in FIGS. 7a and 7b, the support cover 400 according to the present invention includes guide plates 460 which are formed on the outer surface of the support cover 400 in such a way as to be widened in a direction from the upper end to the lower end. The guide plates 460 downwardly guide noise generated by the flow of fluid discharged through the air hole 106 of the air duct 100 to the outside, and prevent foreign materials from entering the air duct 100. In the drawing, the guide plates 460 are arranged in two layers. However, without being limited to the two layers, the number of layers may be increased or reduced as necessary.

Figure 8A:
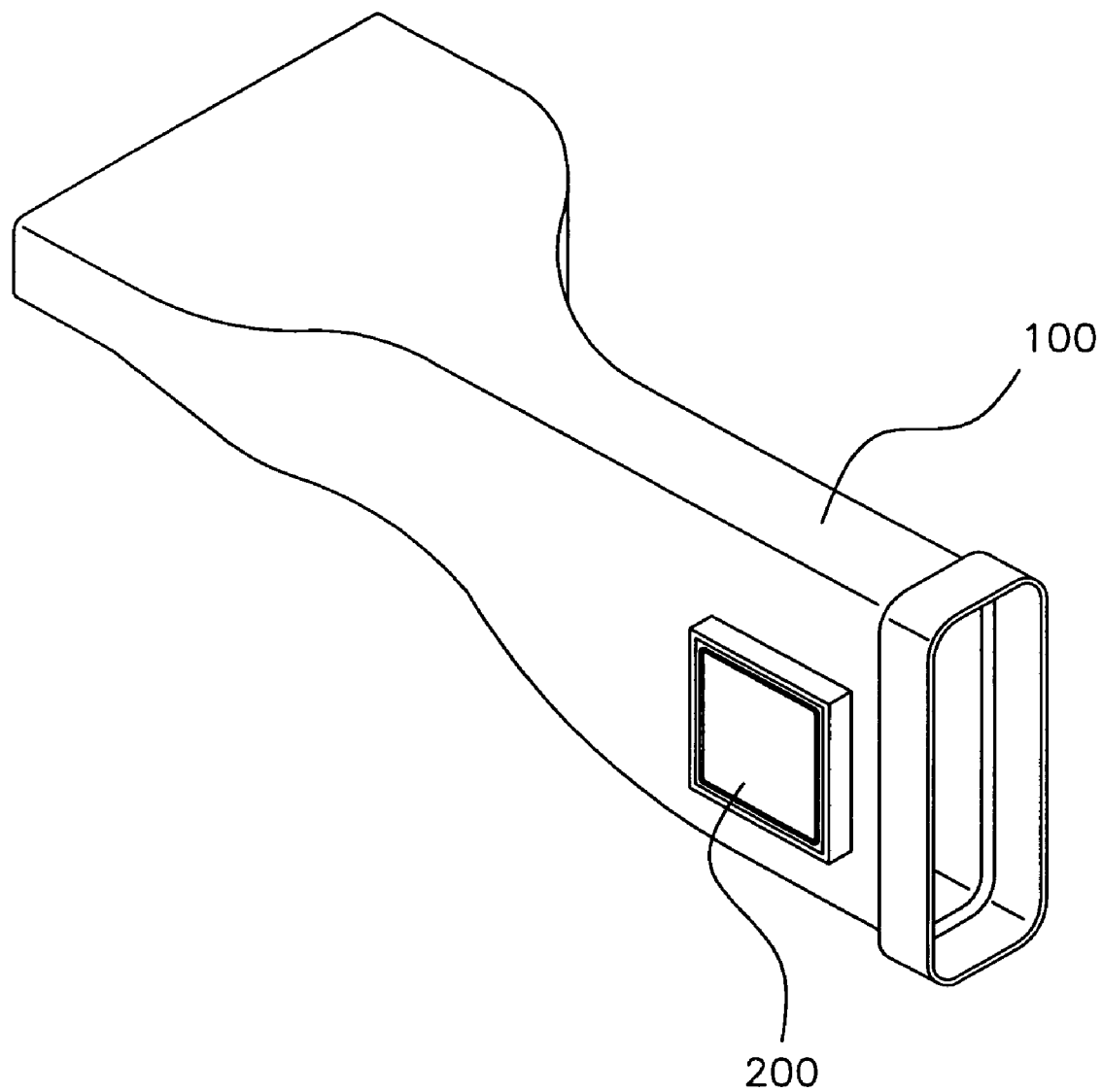
FIGS. 8a and 8b are views illustrating an embodiment wherein the filter unit made of a polyurethane foam material is coupled to the air duct assembly for vehicles according to the present invention, through ultrasonic fusion or thermal fusion.
Figure 8B:
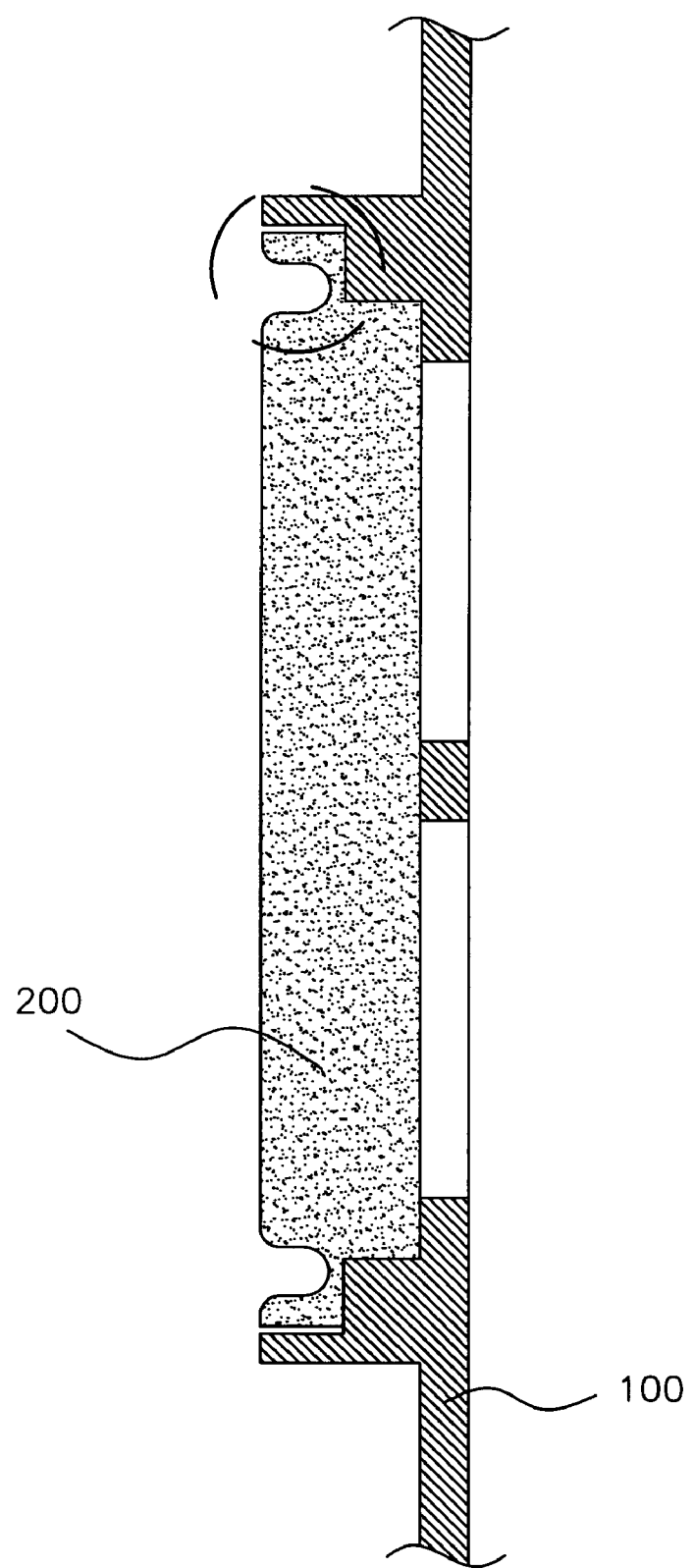

FIGS. 8a and 8b illustrate an embodiment in which the filter unit 200 made of a polyurethane foam material is coupled to the air hole 106 of the air duct 100 according to the present invention through ultrasonic fusion or thermal fusion without using the support cover 400. Portion encircled in FIG. 8b is formed to close the air hole 106 of the air duct 100 through ultrasonic fusion or thermal fusion, so that the filter unit 200 made of the polyurethane foam may be directly coupled to the air hole 106 of the air duct 100 without using an additional part such as the support cover 400.

Figure 9A:
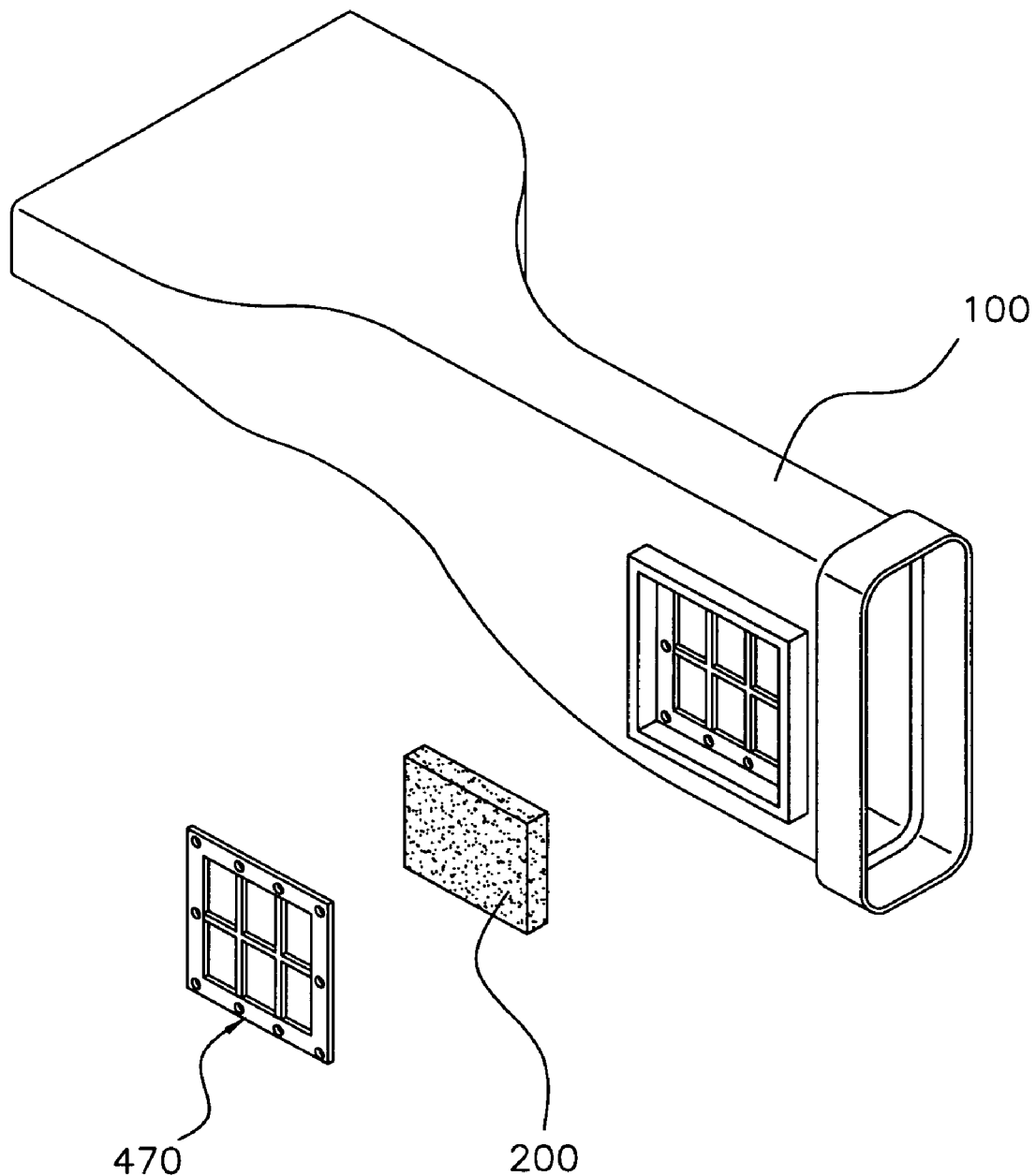
FIGS. 9a and 9c are views illustrating an embodiment wherein the filter unit made of a polyurethane foam material is coupled to the air duct assembly for vehicles according to the present invention, using a screen.
Figure 9B:
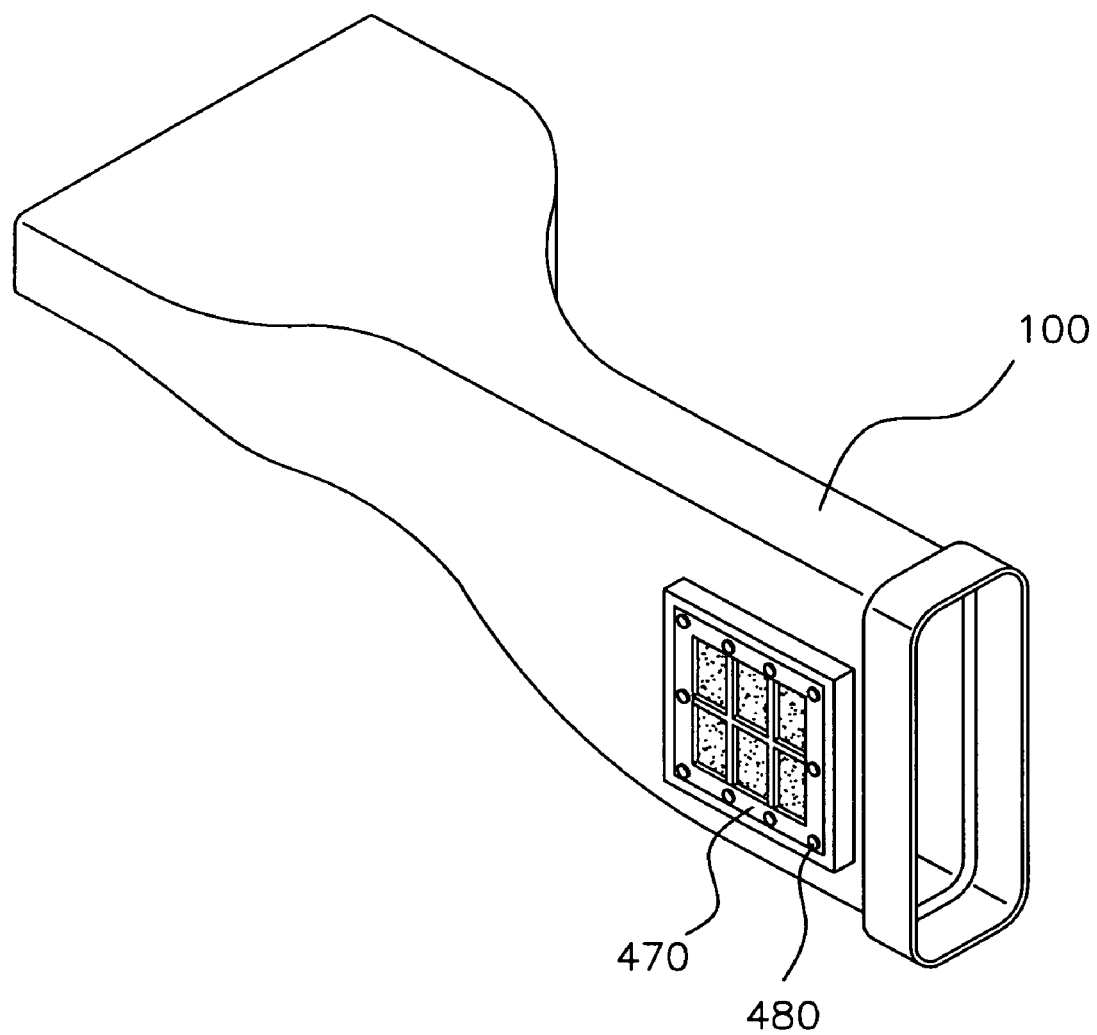
Figure 9C:
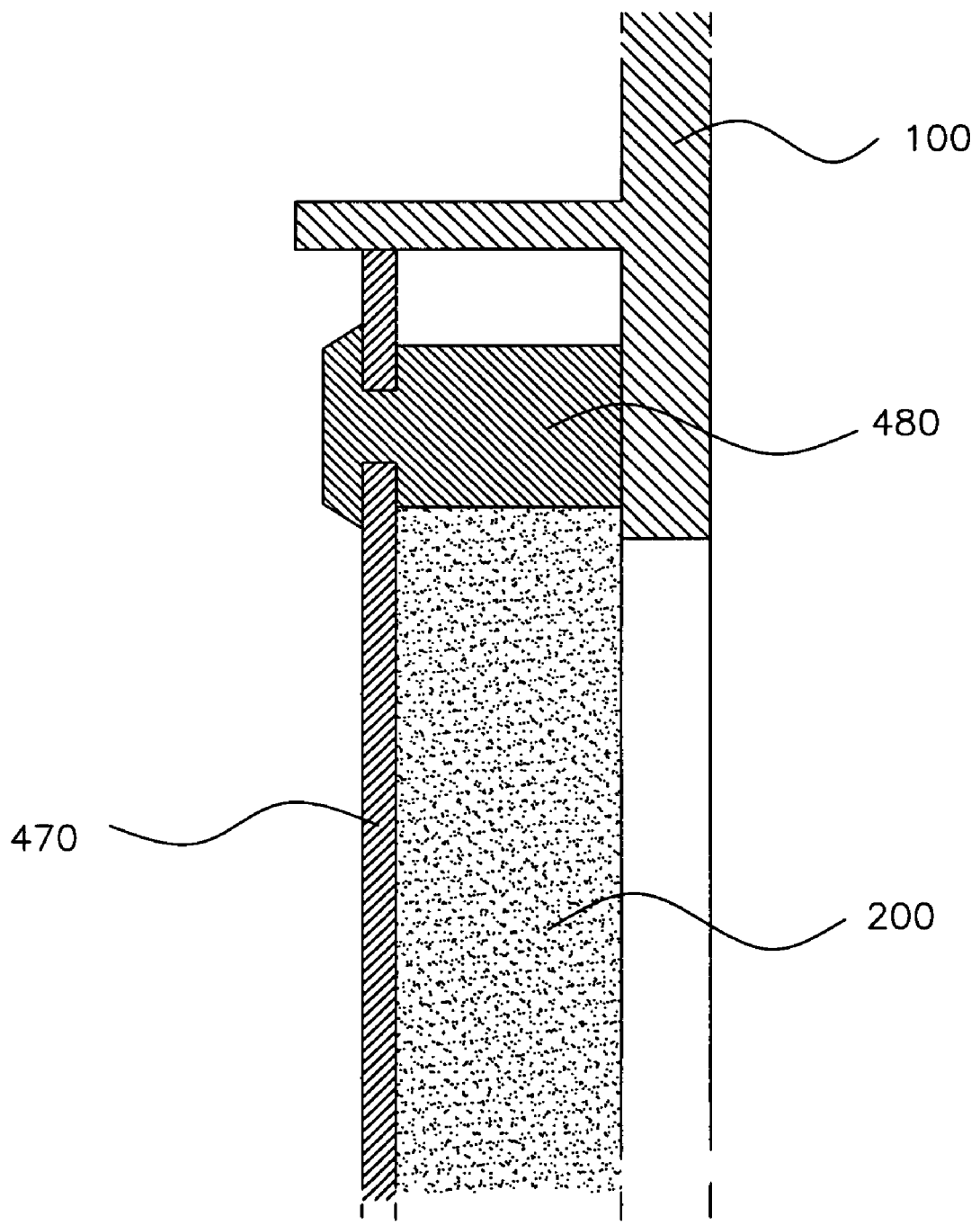

FIGS. 9a, 9b and 9c illustrate another embodiment wherein the filter unit 200 made of a polyurethane foam material is coupled to the air duct 100. According to this embodiment, the filter unit 200 made of a polyurethane foam material is coupled to the air duct 100 using a screen 470. As shown in the drawings, the filter unit 200 made of the polyurethane foam material according to the present invention is coupled to the air duct 100 through the screen 470 having a plurality of holes. In this case, the screen 470 may be coupled to a predetermined portion of the air duct 100 through stacking fusion using additional locking members 480.

In the present invention, various methods have been proposed to couple the filter unit 200 made of the polyurethane foam material according to the present invention to the air duct 100. For example, the method of using the support cover 400, the method of using the screen 470 or the method of coupling only the filter unit 200 to the air duct 100 may be used. One of the methods may be selected according to the design specification or design environment of a product.

Figure 10A:
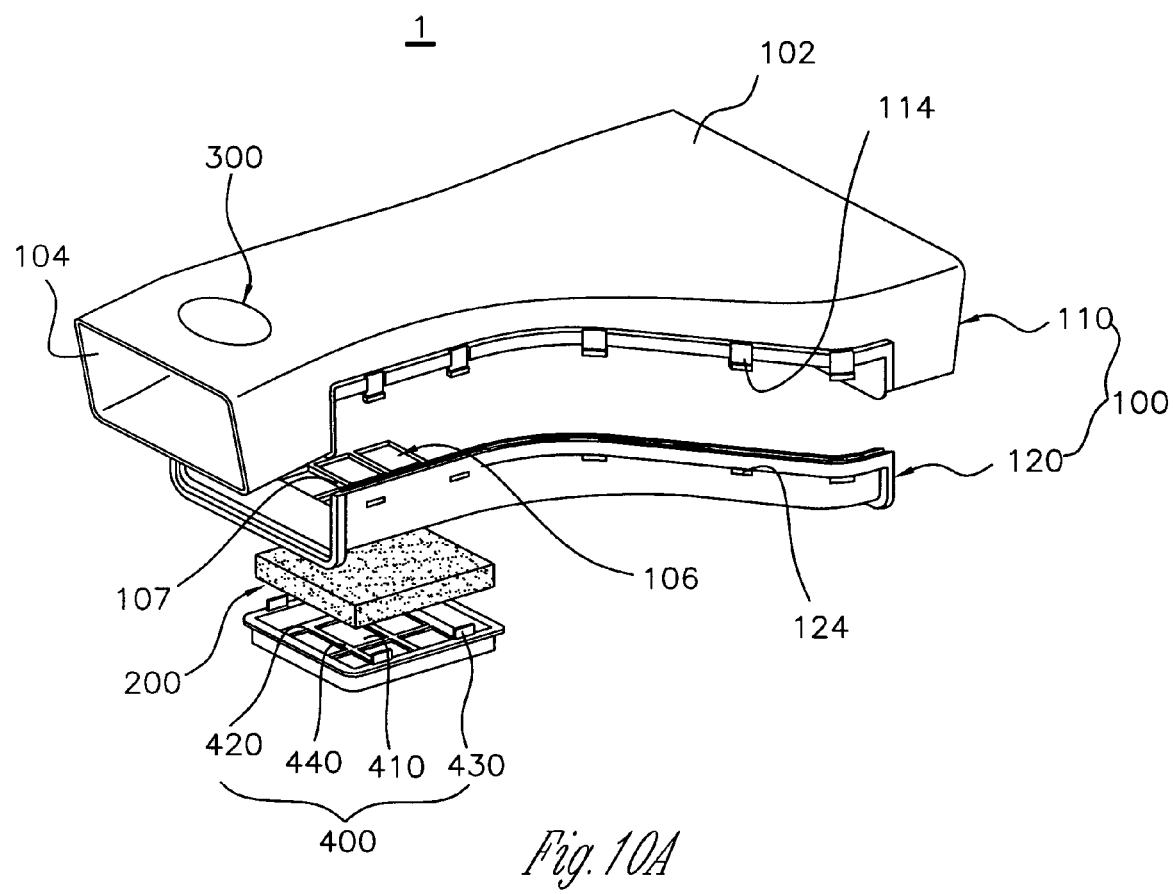
FIGS. 10a and 10b are views illustrating the state in which a noise reduction unit is provided on the air duct assembly for vehicles according to the present invention.
Figure 10B:
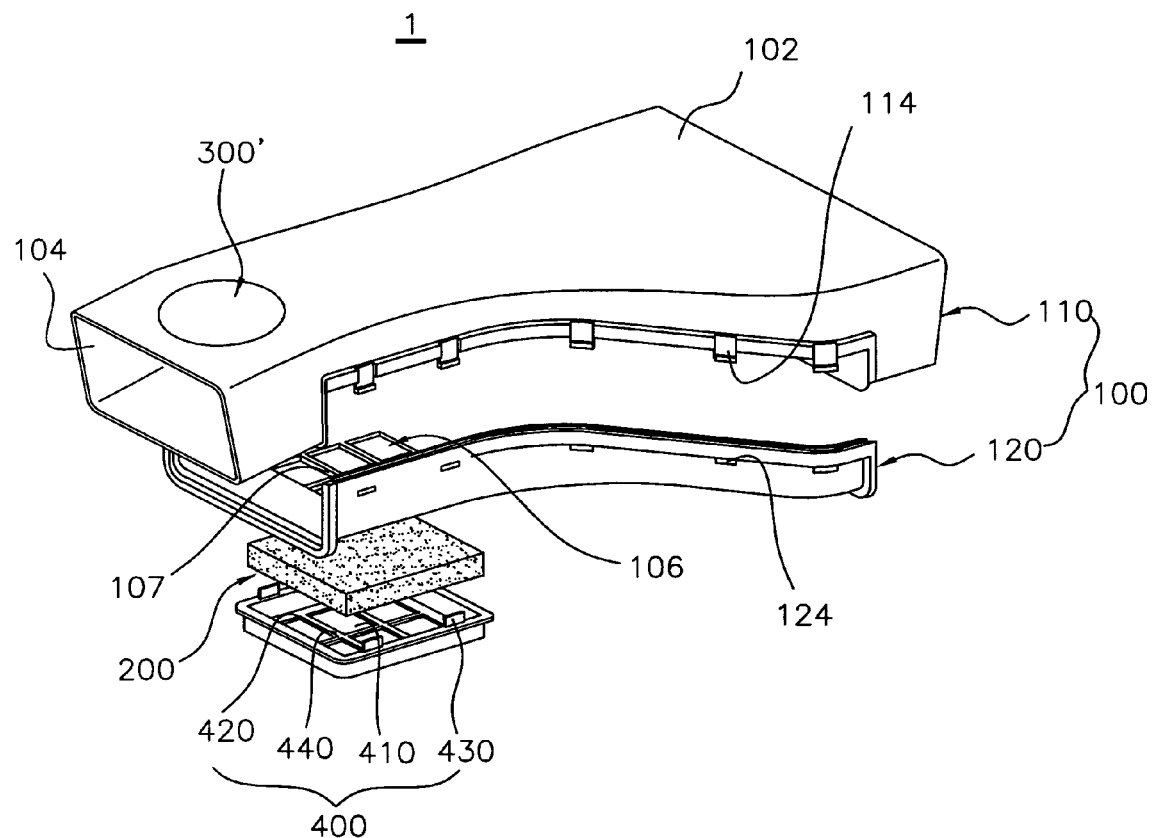

Referring to FIGS. 10a and 10b, the structure of the second air duct 120 to be assembled with the first air duct 110 may be changed so that a hemispherical or elliptical noise reduction unit 300 is provided on the upper surface of the first air duct 110 in such a way as to face the air hole 106 of the second air duct 120.

The noise reduction unit 300 of the first air duct 110 according to the present invention is formed to have a size similar to the diameter of the air hole 106 or have a size suitable for covering the air hole 106.

The noise reduction unit 300 of FIG. 10a protrudes upwards in such a way as to be oriented in the transverse direction of the first air duct 110. Further, as shown in FIG. 10b, the noise reduction unit 300' may protrude upwards in such a way as to be oriented in the longitudinal direction of the first air duct 110.

Figure 11:
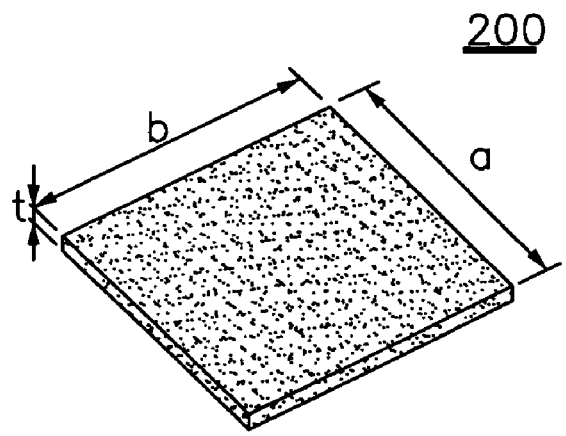
FIG. 11 is a view illustrating the filter unit of the air duct assembly for vehicles according to the present invention.

Referring to FIG. 11, the filter unit 200 according to the present invention is constructed so that the width a and the length b are equal to each other. The thickness t of the filter unit 200 will be described below.

A filter unit according to another embodiment of the present invention will be described with reference to the accompanying drawings.

Figure 12A:
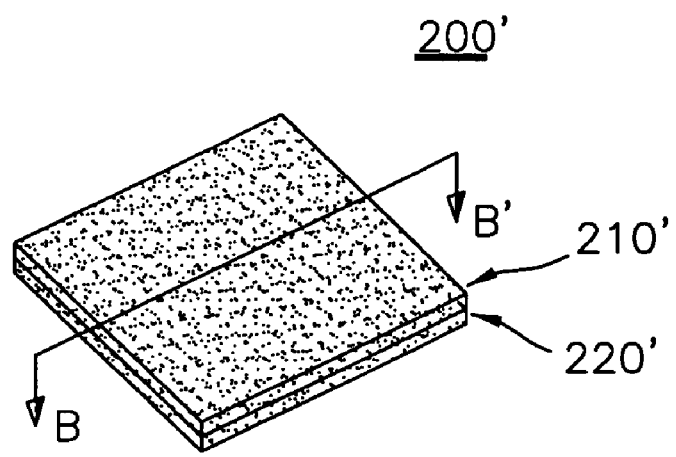
FIG. 12a is a view illustrating another embodiment of the filter unit of the air duct assembly for vehicles according to the present invention.
Figure 12B:
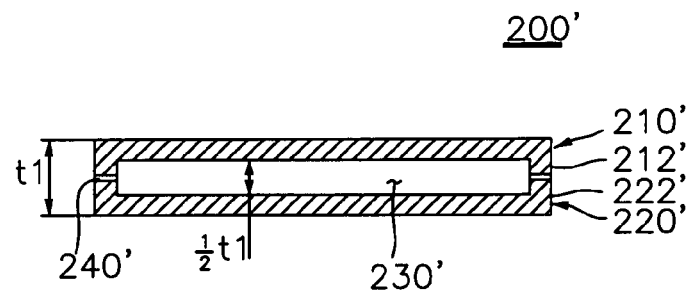
Figure 13:
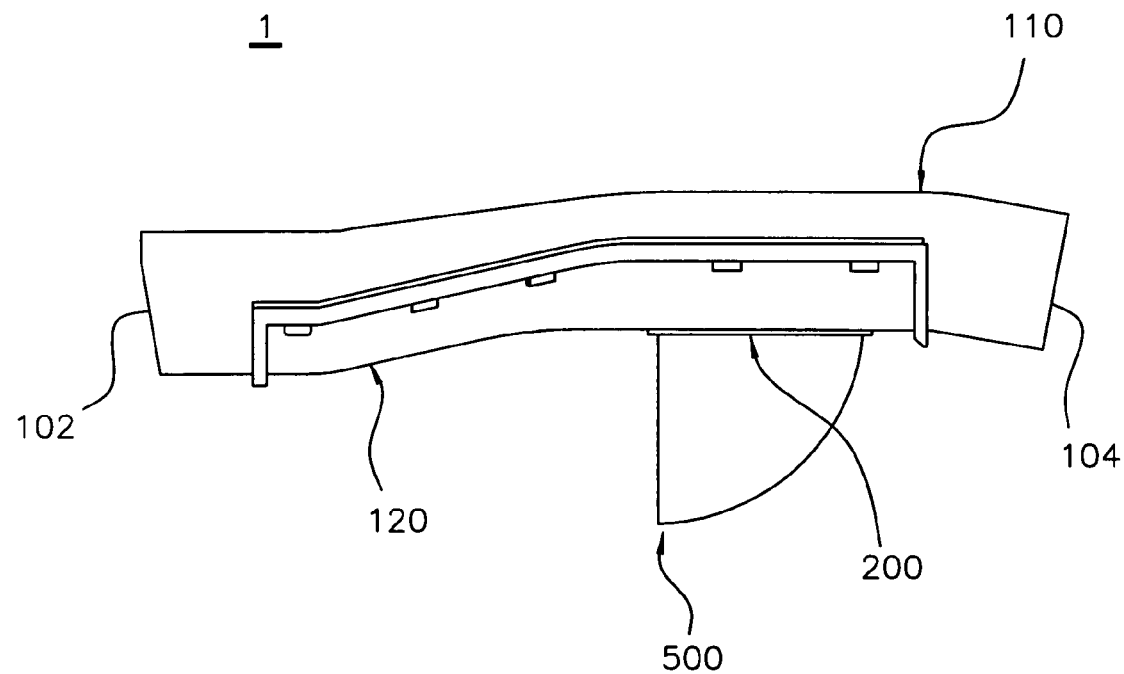
FIG. 13 is a view illustrating the state in which a guide vane is mounted to the air duct assembly for vehicles according to the present invention.
Figure 14:
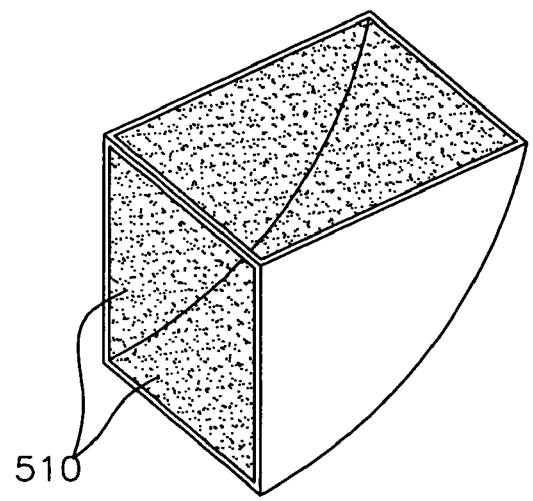
FIG. 14 is a perspective view illustrating the guide vane of the air duct assembly for vehicles according to the present invention.

Referring to FIGS. 12a and 12b, the filter unit 200' according to another embodiment of the present invention is relatively thicker than the filter unit 200 of FIG. 11. The filter unit 200' of the present invention includes first and second filters 210' and 220'. First and second bent parts 212' and 222' are bent at the edges of the first and second filters 210' and 220', respectively. A chamber 2301 is defined between the first and second filters 210' and 220'. The chamber 230' provides a space between the first and second filters 210' and 220', and the function of the chamber 230' will be described below in detail.

Assuming that the total thickness of the first and second bent parts 212' and 222' according to the present invention is t1, the chamber 230' preferably has the thickness of ½*t1. That is, if the thickness of the chamber 230' exceeds t1, it is difficult to mount the filter unit 200' to the air duct assembly 1, and thereby the noise reduction effect varies. For the reason, the chamber 230' is formed to have the thickness of ½*t1.

Further, adhesive layers 240' are applied to both ends of the first and second bent parts 212' and 222', so that the first and second filters 210' and 220' are integrated into a single structure.

Referring to FIGS. 13 to 18, the guide vane 500 may be mounted to the air duct assembly 1 of the present invention to guide the flow of intake air, which flows through the filter unit 200 to the outside of the air duct assembly 1, to the front of the vehicle.

A portion of the guide vane 500 coupled to the support cover 400 is open. The guide vane 500 and the support cover 400 may be coupled to each other through a general coupling method using locking steps or a sliding coupling method. Since the coupling structure of the support cover 400 and the guide vane 500 is not the important features of the present invention, it will be omitted herein. It is apparent to those skilled in the art that coupling structures other than the above-mentioned coupling structures are possible.

The sound absorbing material 510 is attached to the inner surface of the guide vane 500 according to the present invention, that is, a portion through which intake air flows, thus reducing noise generated by the flow of the intake air.

Figure 15:
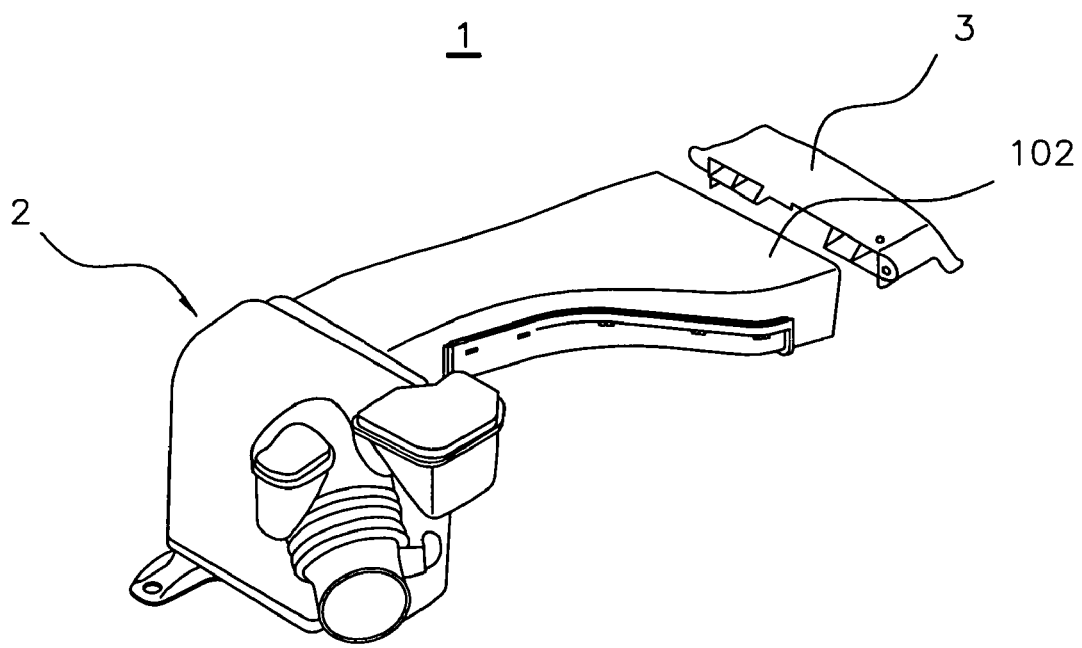
FIG. 15 is a view illustrating the installed state of the air duct assembly for vehicles according to the present invention.

Referring to FIG. 15, the air duct assembly 1 according to the present invention has a shield cover 3 which is mounted to the inlet port 102. The shield cover 3 is provided with a mounting part which is mounted to the bonnet of the vehicle, and is coupled to the inlet port 102 of the air duct assembly 1. The air cleaner 2 is coupled to the outlet port 104 (see FIG. 1).

The operation of the air duct assembly for vehicles according to the present invention will be described with reference to FIG. 16a.

Figure 16A:
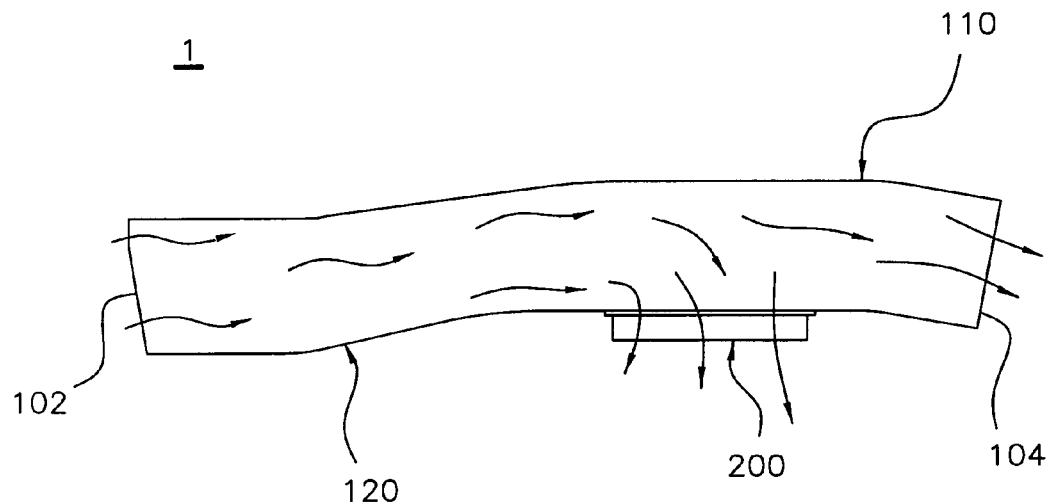
FIGS. 16a to 16d are views illustrating the operation of the air duct assembly for vehicles according to the present invention.

Referring to FIG. 16a, when starting is on with the air duct assembly 1 mounted to the vehicle, fresh air present outside the vehicle is introduced into the inlet port 102 of the air duct assembly 1 by the intake pressure of an engine (not shown).

As shown by the arrows of the drawings, the intake air fed through the inlet port 102 flows along the air duct assembly 1. When the intake air reaches a position having the air hole 106 (see FIG. 1), some of the intake air is discharged through the filter unit 200 to the outside of the air duct assembly 1 as shown by the arrows of the drawings, and the remaining intake air is fed through the outlet port 104 to the air cleaner 2.

Here, the filter unit 200 may be made of the polyurethane foam material having the pores from 50 to 100 ppi. In a detailed description, when the filter unit is made of a polyurethane foam material having the pores of 50 ppi or less, dust may enter the air duct through the pores, and the strength is weak. Thus, the polyurethane foam material having the pores of 50 ppi or less is unsuitable for the filter unit of the present invention. Meanwhile, in the case of using a polyurethane foam material having the pores of 100 ppi or more, noise reduction effect becomes poor, so that the polyurethane foam material having the pores of 100 ppi or more is unsuitable for the filter unit of the present invention. Therefore, as described above, the filter unit 200 according to the present invention is made of the polyurethane foam material having the pores from 50 to 100 ppi.

More preferably, the polyurethane foam having the pores of 80 ppi may be used. This will be described in detail with reference to FIG. 17.

Figure 17:
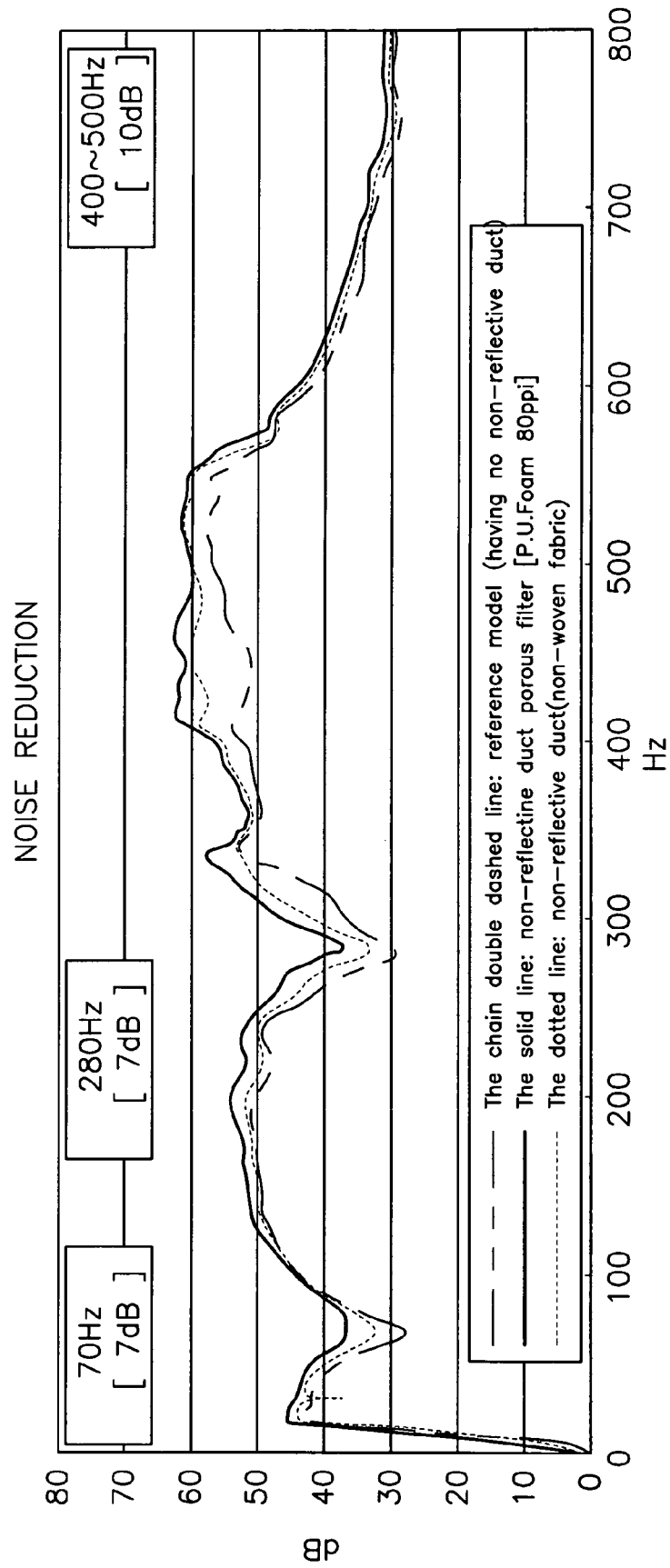
FIG. 17 is a graph illustrating the noise estimating results of the air duct assembly for vehicles according to the present invention and the first and second comparative examples.

Referring to FIG. 17, the chain double-dashed line shown in the graph as the first comparative example illustrates a general tubular air duct having no air hole or filter unit unlike the present invention, and the dotted line shown in the graph as the second comparative example illustrates an air duct having a filter unit which is made of non-woven fabric and mounted to the air hole. The present invention is shown in a solid line, and provides the air duct having the filter unit which is mounted to the air hole and made of the polyurethane foam material having the pores of 80 ppi.

Through the experiments on the present invention and the first and second comparative examples, it can be seen that the filter unit having the pores of 80 ppi according to the present invention has superior noise reduction effect to the first and second comparative examples, in the ranges of 70~100 Hz, 280~300 Hz and 400~500 Hz.

Here, the range from 70 to 100 Hz is a low frequency noise range when the vehicle is started and the engine starts to operate. When comparing the noise reduction effect of the air duct assembly using the filter unit having the pores of 80 ppi according to the present invention with that of the first and second comparative examples, it can be seen that noise is reduced by 7 dB or more. Here, when changing the range from 70 to 100 Hz into the rpm of the engine, it corresponds to the range of about 500 rpm.

The range from 280 to 300 Hz corresponds to the initial running section in which the vehicle starts to run. When comparing the noise reduction effect of the air duct assembly using the filter unit having the pores of 80 ppi according to the present invention with that of the first and second comparative examples, it can be seen that noise is reduced by 7 dB or more. Here, when changing the range from 280 to 300 Hz into the rpm of the engine, it corresponds to the range of about 1500 rpm.

The range from 400 to 500 Hz corresponds to the main running section in which the vehicle runs. When comparing the noise reduction effect of the air duct assembly using the filter unit having the pores of 80 ppi according to the present invention with that of the first and second comparative examples, it can be seen that noise is reduced by 10 dB or more. Here, when changing the range from 400 to 500 Hz into the rpm of the engine, it corresponds to the range of about 2000 to 2500 rpm.

According to the present invention, when the filter unit 200 or 200' made of the polyurethane foam material is mounted to the air hole 106 of the air duct assembly 1, superior noise reduction effect is realized in comparison with an air duct having no air hole 106 and filter unit 200 or 200'. Further, the air duct assembly 1 according to the present invention which is constructed so that the filter unit 200 or 200' made of the polyurethane foam material is mounted to the air hole 106 of the air duct assembly 1 has superior noise reduction effect to the second comparative example using the filter unit 200 or 200' made of non-woven fabric in the initial operation of the engine, the initial running section and the main running section.

The operation of the air duct assembly for vehicles equipped with the noise reduction unit according to the present invention will be described with reference to FIGS. 16b and 16c.

Figure 16B:
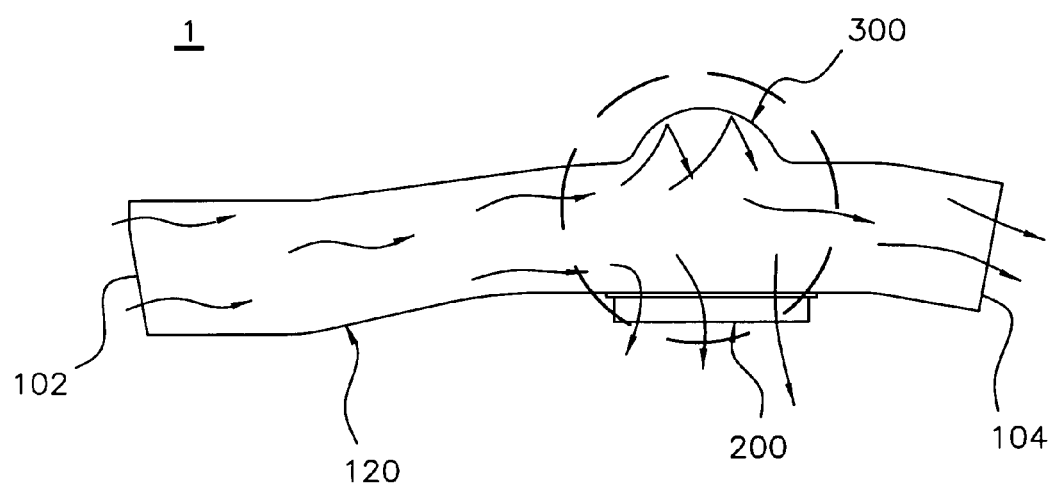
Figure 16C:
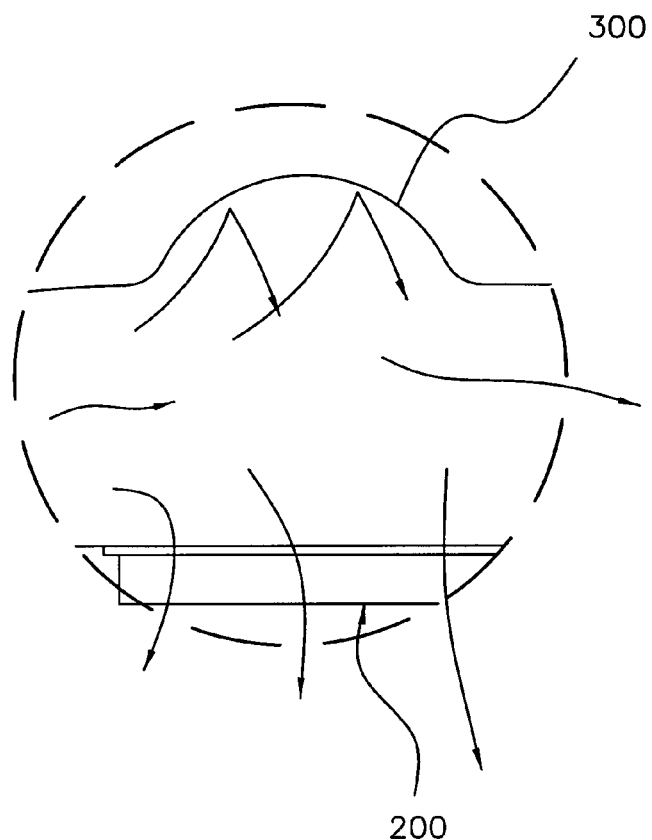

Referring to FIGS. 16b and 16c, the intake air fed into the inlet port 102 of the air duct assembly 1 according to the present invention flows along the air duct assembly 1 as shown by the arrows. When the intake air reaches the noise reduction unit 300 having a hemispherical space, the flow path of the intake air is changed as shown in the drawing. The wavelength of the intake air is dispersed on the noise reduction unit 300, so that the sonic energy of the intake air is reduced, prior to being discharged through the filter unit 200. Thereby, the intake noise generated by the intake pressure of the engine is reduced.

Figure 16D:
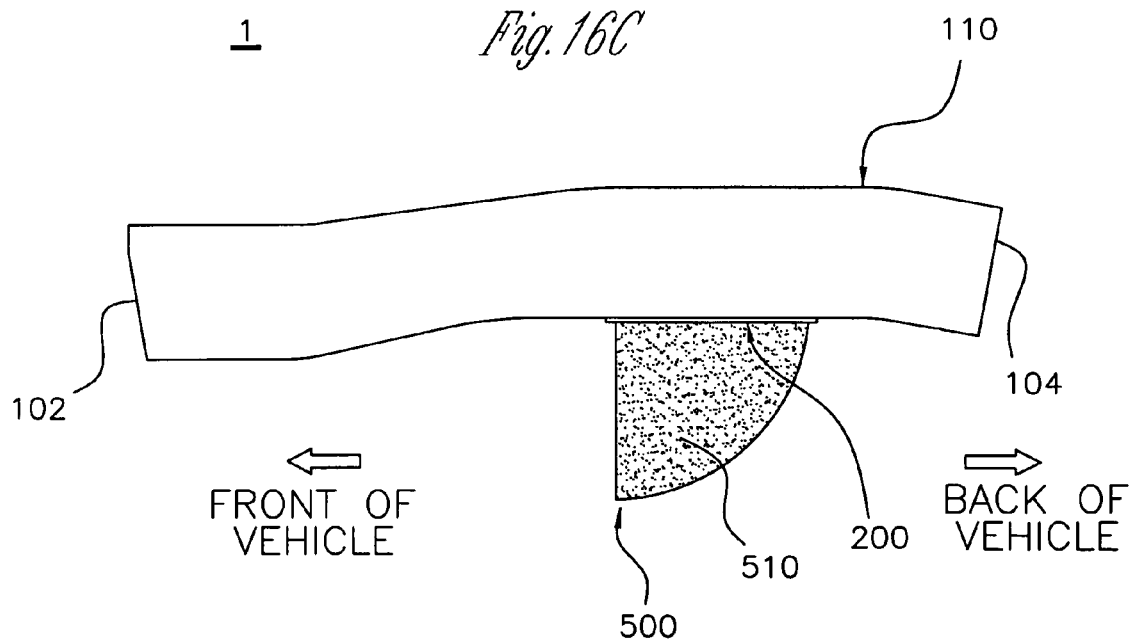

FIG. 16d shows the state in which the guide vane 500 is mounted to the air duct assembly for vehicles according to the present invention Referring to FIG. 16d, some of the intake air introduced into the inlet port 102 of the air duct assembly 1, as shown by the arrows of the drawing, flows through the outlet port 104 to the air cleaner 2, while some of the intake air is discharged through the filter unit 200 to the outside of the air duct assembly 1.

The guide vane 500 is mounted to the air duct assembly 1, thus minimizing noise generated when external air drawn by the intake pressure of the engine is discharged to the outside of the air duct assembly 1, therefore preventing the noise from being transmitted to a driver or passenger riding in the vehicle.

As shown in the drawing, the guide vane 500 changes the discharging direction of the intake air passing through the filter unit 200, thus discharging the intake air to the front of the vehicle, therefore preventing the air from being discharged to a driver's seat.

Further, the sound absorbing material 510 is attached to the inner surface of the guide vane 500, thus reducing the noise of intake air passing through the guide vane 500 prior to discharging the intake air to the front of the vehicle, therefore preventing the noise from being transmitted to the interior of the vehicle.

According to the present invention, the filter unit 200 having the pores from 50 to 100 ppi may be mounted to the air duct assembly 1. It is possible to use the filter unit having the pores of 80 ppi, as described above. Further, the noise evaluating result for the filter unit having the pores of 80 ppi according to the embodiment of the present invention is illustrated in graph. However, the operation of the filter unit having different pores within the above-mentioned range is similar to that of the filter unit having the pores of 80 ppi, so that the detailed description will be omitted herein.

The noise reduction degree for the thickness of the filter unit according to the present invention will be described with reference to FIG. 18.

Figure 18:
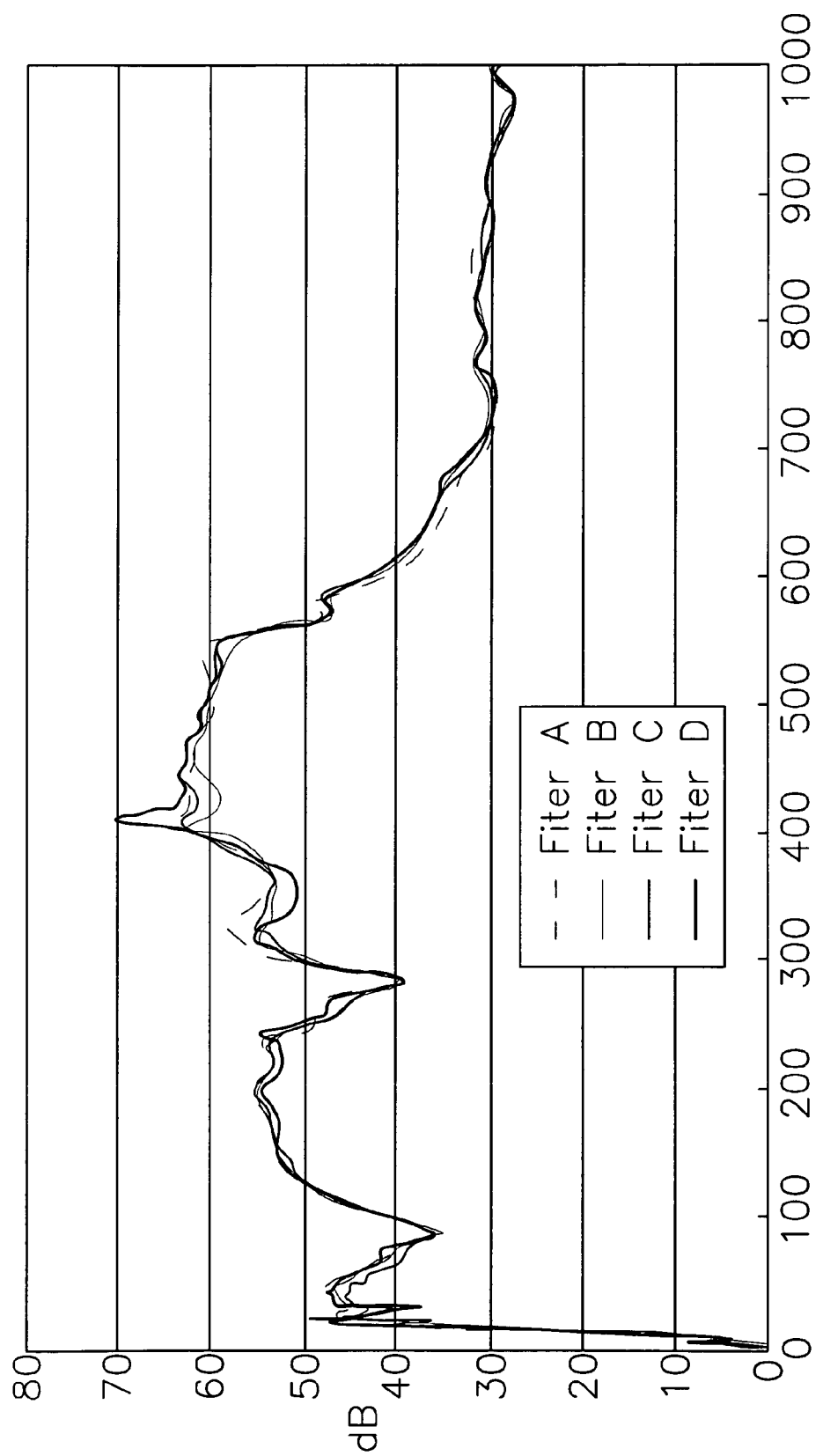
FIG. 18 is a graph illustrating the noise reduction degree as the function of the thickness of the filter unit provided on the air duct assembly for vehicles according to the present invention.

Referring to FIG. 18, the thickness t of the filter unit 200 according to the present invention which is to be mounted to the air hole may be variously changed. In FIG. 18, the filter A has the thickness of 5 mm, the filter B has the thickness of 10 mm, the filter C has the thickness of 15 mm and the filter D has the thickness of 20 mm.

When experiments for the noise reduction degree are made with the filters A to D having the above-mentioned thicknesses, it cane be seen that superior noise reduction degree is obtained when the filter unit has the thickness from 5 mm to 20 mm. The air duct assembly 1 according to the present invention equipped with the filter unit having the above-mentioned thickness also has the noise reduction effect.

Figure 19A:
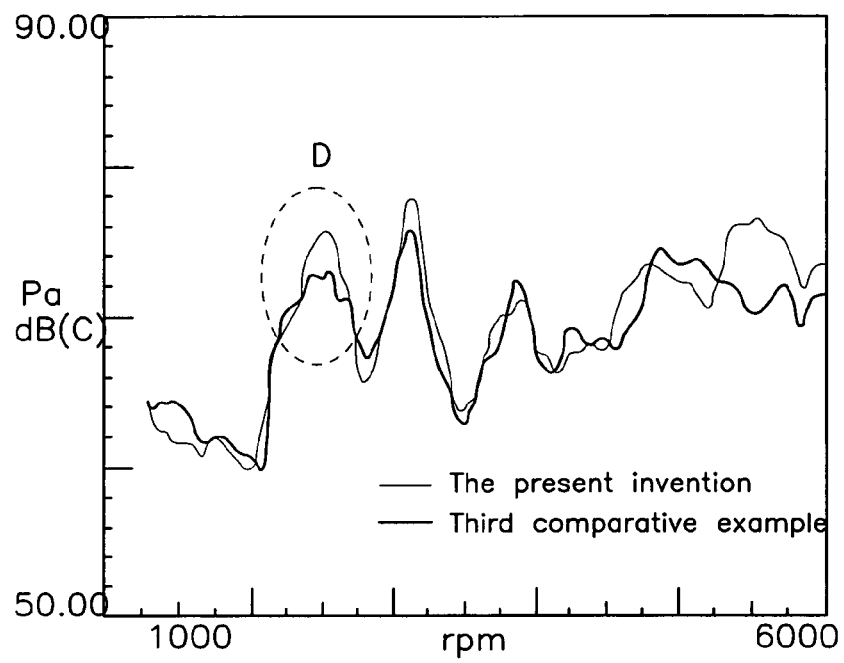
FIGS. 19a and 19b are graphs illustrating the comparison of noise in front and rear seats in a vehicle when the air duct assembly for vehicles according to the present invention is mounted to the vehicle with noise of the third comparative example.
Figure 19B:
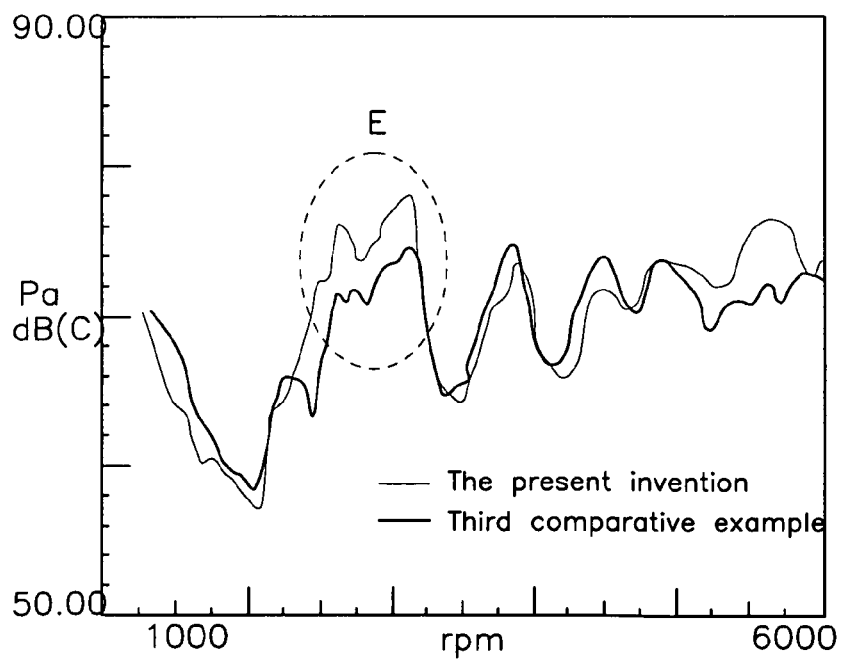

The noise reduction effect for front and rear seats using the air duct assembly according to the present invention will be compared with the third comparative example, with reference to FIGS. 19a and 19b.

FIG. 19a is the graph showing the reduction of noise generated in the front seat using the air duct assembly of the present invention and the third comparative example (air duct having no filter unit).

In FIG. 19a, the thick solid line is the graph illustrating the air duct assembly according to the present invention, and the thin solid line is the graph illustrating the third comparative example. In portion D encircled in the drawing, the air duct assembly 1 of the present invention has higher noise reduction effect than the third comparative example. The portion D corresponds to the range in which the engine has 1500 to 2000 rpm. This supports the noise reduction effect compared with that of the first and second comparative examples.

FIG. 19b is the graph showing the reduction of noise generated in the rear seat using the air duct assembly of the present invention and the third comparative example (air duct having no filter unit).

In portion E encircled in FIG. 19b, the air duct assembly 1 of the present invention has higher noise reduction effect than the third comparative example.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides an air duct assembly for vehicles, which effectively reduces noise generated by the intake pressure of an engine, and minimizes the transfer of noise to a driver and a passenger riding in a vehicle regardless of the rpm of the engine.

Further, it is not necessary to install an additional resonator, so that easy installation is achieved while satisfying the layout in an engine room, and thus workability and marketability are improved.

What is claimed is:

1. An air duct assembly for vehicles, comprising:
   an air duct including:
   an inlet port formed in one end of the air duct, the inlet port being configured to intake air from outside the air duct;
   an outlet port formed in another end of the air duct, the outlet port being coupled to an air cleaner; and
   an air hole formed in a path along which intake air flows; and
   a filter unit mounted to the air hole of the air duct, the filter unit being formed of a polyurethane foam and configured to attenuate noise in all frequency bands of the intake air introduced through the air duct, the filter unit including:
   a first filter bent at an edge thereof downwards to have a first bent part;
   a second filter coupled to a lower portion of the first filter, and bent at an edge thereof upwards to have a second bent part; and
   a chamber defined in a central portion between the first and second filters which are in surface contact with each other, wherein the chamber is configured to reduce a velocity of the intake air which passes through the first filter.

2. The air duct assembly as set forth in claim 1, wherein the filter unit comprises polyurethane foam having pores from 50 to 100 ppi.

3. The air duct assembly as set forth in claim 2, wherein the filter unit comprises polyurethane foam having pores of 80 ppi.

4. The air duct assembly as set forth in claim 1, wherein:
   the air duct comprises a first air duct and a second air duct which are joined together, the second air duct having the air hole, and
   a noise reduction unit is provided on the first air duct, the noise reduction unit facing the air hole formed in the second air duct and protruding out from the first air duct in a rounded shape, the noise reduction unit configured to delay a flow of the intake air circulating through the air duct according to variation of rpm of an engine, thus reducing noise.

5. The air duct assembly as set forth in claim 4, wherein:
   the first air duct extends to the outlet port and includes a portion where the inlet port is formed that has a horizontal length greater than a vertical length, the horizontal length decreasing and the vertical length increasing toward a portion where the outlet port is formed; and
   the second air duct is coupled to a lower portion of the first air duct.

6. The air duct assembly as set forth in claim 1, wherein:
   the air duct comprises a support cover mounted to a lower portion of the filter unit, the support cover configured to inhibit removal of the filter unit and stably support the filter unit; and
   a discharge hole is formed in the support cover, the discharge hole configured to reliably discharge the intake air which passes through the filter unit and circulates.

7. The air duct assembly as set forth in claim 6, wherein the support cover comprises:
   a seating groove formed along an inner edge of the support cover at a position outside the discharge hole so that the filter unit is seated into the seating groove; and
   a locking hook provided at a position outside the seating groove and locked to the air duct.

8. The air duct assembly as set forth in claim 6, wherein the support cover is coupled to the air duct through force-fitting.

9. The air duct assembly as set forth in claim 6, wherein one or more layers of guide plates are provided on an outer surface of the support cover in such a way as to be widened in a direction from an upper end of each of the guide plates to a lower end thereof, thus preventing foreign materials from entering the air duct and downwardly guiding a flow of fluid discharged from the air duct to an exterior, therefore reducing noise generated by the flow of the fluid.

10. The air duct assembly as set forth in claim 1, wherein the filter unit made of the polyurethane foam material is directly mounted to the air hole of the air duct through ultrasonic fusion or thermal fusion.

11. The air duct assembly as set forth in claim 1, comprising a screen coupled to the air duct, the screen configured to inhibit separation of the filter unit and stably support and fix the filter unit.

12. The air duct assembly as set forth in claim 1, wherein, assuming that a total thickness of the first and second bent parts of the first and second filters is t1, a thickness of the central portion between the first and second filters is ½*t1 to minimize resistance of the intake air and permit smooth flow thereof.

13. The air duct assembly as set forth in claim 1, wherein a guide vane is mounted to the lower portion of the filter unit and guides the intake air, passing through the filter unit and discharged to an outside of the air duct, to a front of a vehicle, thus minimizing transmission of noise to an interior of the vehicle.

14. The air duct assembly as set forth in claim 13, wherein a sound absorbing material is attached to an inner surface of the guide vane which is in surface contact with exhaust air.

15. An air duct assembly for vehicles, comprising:
an air duct including:
an inlet port formed in one end of the air duct, the inlet port being configured to intake air from outside the air duct;
an outlet port formed in another end of the air duct, the outlet port being coupled to an air cleaner; and
an air hole formed in a path along which intake air flows;
a filter unit formed in the air hole and including a plurality of pores, the filter unit configured to attenuate noise in all frequency bands of the intake air introduced through the air duct, wherein the filter unit includes:
a first filter bent at an edge thereof downwards to have a first bent part;
a second filter coupled to a lower portion of the first filter, and bent at an edge thereof upwards to have a second bent part; and
a chamber defined in a central portion between the first and second filters which are in surface contact with each other, wherein the chamber is configured to reduce a velocity of the intake air which passes through the first filter; and
a support cover installed at a lower portion of the filter unit, the support cover configured to inhibit separation of the filter unit and to stably support and fix the filter unit, the support cover including a discharge hole formed in the support cover, the discharge hole configured to discharge the intake air flowing through the filter unit.

16. The air duct assembly as set forth in claim 15, wherein the filter unit comprises polyurethane foam having pores from 50 to 100 ppi.

17. The air duct assembly as set forth in claim 16, wherein the filter unit comprises polyurethane foam having pores of 80 ppi.

18. The air duct assembly as set forth in claim 15, wherein the support cover is coupled to the air duct through force-fitting.

19. The air duct assembly as set forth in claim 15, wherein one or more layers of guide plates are provided on an outer surface of the support cover in such a way as to be widened in a direction from an upper end of each of the guide plates to a lower end thereof, thus preventing foreign materials from entering the air duct and downwardly guiding a flow of fluid discharged from the air duct to an exterior, therefore reducing noise generated by the flow of the fluid.

* * * * *